(12) United States Patent
Moule et al.

(10) Patent No.: US 10,089,778 B2
(45) Date of Patent: Oct. 2, 2018

(54) SYSTEM AND METHOD FOR AUTOMATIC ALIGNMENT AND PROJECTION MAPPING

(71) Applicant: CHRISTIE DIGITAL SYSTEMS USA, INC., Cypress, CA (US)

(72) Inventors: Kevin Moule, Kitchener (CA); Derek Scott, Kitchener (CA); Nick Wasilka, Kitchener (CA); Ian James Fraser, Kitchener (CA); James Robinson, Elmira (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 271 days.

(21) Appl. No.: 14/820,693

(22) Filed: Aug. 7, 2015

(65) Prior Publication Data

US 2017/0039756 A1 Feb. 9, 2017

(51) Int. Cl.
*G06T 15/10* (2011.01)
*G06T 19/00* (2011.01)
*H04N 13/02* (2006.01)
*H04N 13/204* (2018.01)
*G06T 7/521* (2017.01)
(Continued)

(52) U.S. Cl.
CPC ............. *G06T 15/10* (2013.01); *G06T 7/521* (2017.01); *G06T 7/593* (2017.01); *G06T 7/85* (2017.01); *G06T 19/006* (2013.01); *H04N 5/74* (2013.01); *H04N 13/0203* (2013.01); *H04N 13/204* (2018.05)

(58) Field of Classification Search
CPC . G01B 11/2545; G01B 11/2513; G06T 7/521; H04N 5/74
See application file for complete search history.

(56) References Cited

U.S. PATENT DOCUMENTS

2006/0192925 A1* 8/2006 Chang ................... G03B 21/14
353/94
2009/0067749 A1* 3/2009 Schiewe ............. H04N 9/3185
382/294

OTHER PUBLICATIONS

"A Self-Calibrating Method for Photogeometric Acquisition of 3D Objects", Daniel G. Aliaga, Yi Xu, IEEE Transactions on Pattern Analysis and Machine Intelligence, vol. 32, No. 4, Apr. 2010, p. 747-754.*

(Continued)

*Primary Examiner* — Gims Philippe
*Assistant Examiner* — Mainul Hasan
(74) *Attorney, Agent, or Firm* — Perry + Currier, Inc.

(57) ABSTRACT

A projector and at least two cameras are mounted with fields of view that overlap a projection area on a three-dimensional environment. A computing device: controls the projector to project structured light patterns that uniquely illuminate portions of the environment; acquires images of the patterns from the cameras; generates a two-dimensional mapping of the portions between projector and camera space and by processing the images and correlated patterns; generates a cloud of points representing the environment using the mapping and camera positions; determines a projector location, orientation and lens characteristics from the cloud; positions a virtual camera relative to a virtual three-dimensional environment, corresponding to the environment, parameters of the virtual camera respectively matching parameters of the projector; and, controls the projector to project based on a virtual location, orientation and characteristics of the virtual camera.

16 Claims, 19 Drawing Sheets

(51) Int. Cl.
  *G06T 7/593* (2017.01)
  *H04N 5/74* (2006.01)
  *G06T 7/80* (2017.01)

(56) References Cited

OTHER PUBLICATIONS https://www.mersive.com/, downloaded Aug. 6, 2015.
https://github.com/YCAMInterlab/ProCamToolkit/wiki/mapamok-%28English%29, downloaded Aug. 6, 2015.
https://www.facebook.com/TouchDesigner/posts/190876167725872.
http://www.dataton.com/watchout.
http://www.christiedigital.com/en-us/3d/products-and-solutions/3d-projection-solutions/christie-twist/Pages/default.aspx.
http://www.christiedigital.com/en-us/3D/products-and-solutions/3d-projection-solutions/christie-autocal/Pages/default.aspx.
http://vioso.com.
http://www.scalabledisplay.com/.
https://www.facebook.com/TouchDesigner/posts/190876167725872, downloaded Aug. 7, 2015.
http://www.dataton.com/watchout, downloaded Aug. 7, 2015.
http://www.christiedigital.com/en-us/3d/products-and-solutions/3d-projection-solutions/christie-twist/Pages/default.aspx, downloaded Aug. 7, 2015.
http://www.christiedigital.com/en-us/3D/products-and-solutions/3d-projection-solutions/christie-autocal/Pages/default.aspx, downloaded Aug. 7, 2015.
Vioso Software: http://vioso.com, downloaded Aug. 7, 2015.
Scalable Display Technologies: http://www.scalabledisplay.com/, downloaded Aug. 7, 2015.
Extended Search Report dated Dec. 8, 2016 for European Patent Application No. 16182483.4.
Francois Berry et al: "A Visual Servoing-Based Method for ProCam Systems Calibration", Sensors, vol. 13, no1 10, Oct. 1, 2013 (Oct. 1, 2013), pp. 13318-13333, XP055245256, CH ISSN: 1424-8220, DOI: 10.3390/s131013318 *the whole document*.
Yousef B. Mahdy et al: "Projectior Calibration Using Passive Stereo and Triangulation", International Journal of Future Computer and Communication, Oct. 1, 2013 (Oct. 1, 2013), pp. 385-390, XP055232426, ISSN: 2010-3751, DO: 10.7763/IJCFCC.2013.V2.191 *the whole document*.
Aliaga D G et al: "A Self-Calibrating Method for Photogeometric Acquisition of 3D Objects" IEEE Transactions on Pattern Analysis and Machine Intelligence, IEEE Computer Society, USA, vol. 32, No. 4, Apr. 1, 2010 (Apr. 1, 2010), pp. 747-754, XP011321491, ISSN: 0162-8828, DOI: 10.1109'TPAMI.2009.202*the whole document*.

* cited by examiner

SYSTEM AND METHOD FOR AUTOMATIC ALIGNMENT AND PROJECTION MAPPING

FIELD

The specification relates generally to projectors, and specifically to a system and method for automatic alignment and projection mapping.

BACKGROUND

Projection mapping, in a projection system, is often a very complicated process due to the careful alignment of projectors required to align numerous two-dimensional ("2D") projected images onto a three-dimensional ("3D") physical object. The content to be projected is often crafted ahead of time, without access to the final projection mapping. Furthermore, the locations from where the projectors will be projecting are not known with any reasonable degree of accuracy. This naturally leads to warping being needed to align the desired imagery to the final projection surface. This warping process tackles the following problems as a whole: a. discrepancies from where the 2D content was intended to be projected and the final actual projector location; b. discrepancies between the 3D surface used to design the content and the final actual projection surface; and c. discrepancies between the ideal projection system used during content development and the final projector hardware (pixel aspect ratio, lens distortion, etc.).Without knowledge of the location of the projectors, the warping must be adjusted manually, for example by a technician setting up the projection system and/or the location of the projectors must be manually configured.

Indeed, it is often the case that the points described above aren't easily identified in the act of content creation. Ad-hoc projection mapping may simply have 2D content crafted using some notion of what the artist/content creator had in mind, and then made to fit when being projected. Hence, such ad-hoc projection mapping is generally performed after an odious manual set-up procedure, implemented by a technician operating the projection system to manually warp all the pixels in the projected images to achieve an overall alignment goal. If the projector moves relative to the 3D objects onto which images are being projected, the manual set-up procedure/manual warping needs to be repeated, with the technician again visiting the site to perform the warping, which can lead to down-time of the projection system. While some automatic systems exist for automatically performing warping onto three-dimensional objects, they generally work only for non-complex geometries. Alternatively, projector pose can be determined by manually by a technician dragging points manually onto an object, with back calculation being used to determine where projector is located, however this method suffers from the same problems as manual warping.

SUMMARY

In general, this disclosure is directed to a system and method for projection mapping which is fully automated, for example to determine projector parameters used to generate an image to be projected, taking into account the position of the projector and/or a position of an object to be projected on, and which can hence can occur without the intervention of a specially trained technician. Specifically, at least two cameras are aimed at a three-dimensional environment, respective fields of view of the at least two cameras at least partially overlapping a projection area of at least one projector. In general, the cameras provide a stereo view of the three-dimensional environment. The projector projects one or more structured light patterns onto the three-dimensional environment, the one or more structured light patterns configured to uniquely identify portions of the three-dimensional environment. For example, the one or more structured light patterns can comprise bars with increasing or decreasing width, the bars overlapping from pattern to pattern such that when the cameras capture correlated images of the structured light patterns and the correlated images compare to the one or more structured light patterns, the portions of the three-dimensional environment can be identified; alternatively one or more color structured light patterns, of varying colour, can be used to uniquely identify the portions of the three-dimensional environment. The size of the portions can depend on the size of the bars, the resolution of the projector and the resolution of the cameras. From the images of the one or more structured light patterns captured by each camera, and the correlated images of the one or more structured light patterns, a two-dimensional mapping of the portions is generated to map projector space to camera space. From the two-dimensional mapping, and given positions of the cameras, a cloud of points representing the three-dimensional environment is generated using, for example, triangulation techniques. From the cloud of points, a location, an orientation and lens characteristics of the projector relative to the three-dimensional environment is determined, and a virtual camera technique is used to control the projector to project; for example, the projector is controlled to project images based on a virtual location, a virtual orientation and virtual lens characteristics of a virtual camera which respectively match the location, the orientation and the lens characteristics of the projector. Furthermore, when a virtual model of a physical object in the three-dimensional environment is available, and the physical object is imaged when the one or more structured light patterns are projected there upon to generate the cloud of points, the model is compared to the cloud of points to determine a virtual location and virtual orientation of the virtual model in a virtual three-dimensional environment with respect to a virtual origin, related to a physical origin of the three-dimensional environment; the projector can then be controlled to project the images onto the physical object using the virtual location and virtual orientation of the virtual model. Indeed, the images that are generated and/or rendered for projection hence already take into account the geometry of the projector and/or the physical object thereby obviating the need to warp the rendered and/or projected images and/or obviate the need to manually determine projector pose.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a system comprising: a computing device; a projector; and at least two cameras, each of the projector and the at least two cameras mounted relative to a three-dimensional environment with respective fields of view at least partially overlapping a projection area of the projector on the three-dimensional environment; the computing device configured to: control the projector to sequentially project one or more structured light patterns configured to uniquely illuminate different portions of the three-dimensional environment; acquire one or more respective images from each of the at least two cameras while the projector is projecting the one or more structured light patterns, each of the one or more respective images correlated with a given respective structured light pattern; generate a two-dimensional mapping of the different portions of the three-dimensional environment between a projector space and a camera space by processing the respective images and correlated given respective structured light patterns; generate a cloud of points representing the three-dimensional environment using the two-dimensional mapping and given positions of the at least two cameras relative to the three-dimensional environment; determine a location, an orientation and lens characteristics of the projector relative to the three-dimensional environment, from the cloud of points; position a virtual camera relative to a virtual three-dimensional environment, corresponding to the three-dimensional environment, a virtual location, a virtual orientation and virtual lens characteristics of the virtual camera respectively matching the location, the orientation and the lens characteristics of the projector; and, control the projector to project based on the virtual location, the virtual orientation and the virtual lens characteristics of the virtual camera.

The three-dimensional environment can comprise a physical object, and the system further can comprise a memory storing a virtual model of the physical object, the computing device can be further configured to: determine a respective location and respective orientation of the physical object relative to a physical origin of the three-dimensional environment by comparing the virtual model to the cloud of points; set a virtual location and virtual orientation of the virtual model in the virtual three-dimensional environment with respect to a virtual origin, related to the physical origin, to match the respective location and the respective orientation of the physical object; and, control the projector to illuminate the physical object with images adjusted for the virtual location and the virtual orientation of the virtual model. The comparing the virtual model to the cloud of points can comprise an iterative closest point scheme.

The three-dimensional environment can comprise one or more of: a physical object on a surface; a curved surface; and an irregular surface.

The one or more structured light patterns can comprise a sequence of structured light patterns configured to uniquely sequentially illuminate different portions of the three-dimensional environment.

The one or more structured light patterns can comprise a sequence of images of horizontal bars and vertical bars, the bars either halving or doubling in width within the sequence and in each direction.

The one or more structured light patterns can comprise one or more of: a sequence of images of bars; black and white images; colored images; and images of sinusoids.

The computing device can be further configured to determine the given positions of the at least two cameras relative to the three-dimensional environment, and set a physical origin of the three-dimensional environment by: acquiring at least one image of a known target pattern positioned in the three-dimensional environment from each of the at least two cameras; and, comparing the at least one image of the known target pattern with a representation of the known target pattern.

The computing device can be further configured to generate the cloud of points representing the three-dimensional environment using the two-dimensional mapping and the given positions of the at least two cameras relative to the three-dimensional environment using triangulation.

The computing device can be further configured to determine the location, the orientation and the lens characteristics of the projector relative to the three-dimensional environment, from the cloud of points by matching a plurality of points from the cloud of points to respective areas of one or more of the structured light patterns.

The virtual location, the virtual orientation and the virtual lens characteristics can comprise pose data comprising: a three-dimensional position of the virtual camera in the virtual three-dimensional environment with respect to a virtual origin, related to the physical origin; a pitch value; a yaw value; a roll value; an offset value; and a throw value.

Another aspect of the specification provides a method comprising: in system comprising: a computing device; a projector; and at least two cameras, each of the projector and the at least two cameras mounted relative to a three-dimensional environment with respective fields of view at least partially overlapping a projection area of the projector on the three-dimensional environment, controlling the projector, using the computing device, to sequentially project one or more structured light patterns configured to uniquely illuminate different portions of the three-dimensional environment; acquiring one or more respective images from each of the at least two cameras, using the computing device, while the projector is projecting the one or more structured light patterns, each of the one or more respective images correlated with a given respective structured light pattern; generating, using the computing device, a two-dimensional mapping of the different portions of the three-dimensional environment between a projector space and a camera space by processing the respective images and correlated given respective structured light patterns; generating, using the computing device, a cloud of points representing the three-dimensional environment using the two-dimensional mapping and given positions of the at least two cameras relative to the three-dimensional environment; determining, using the computing device, a location, an orientation and lens characteristics of the projector relative to the three-dimensional environment, from the cloud of points; positioning, using the computing device, a virtual camera relative to a virtual three-dimensional environment, corresponding to the three-dimensional environment, a virtual location, a virtual orientation and virtual lens characteristics of the virtual camera respectively matching the location, the orientation and the lens characteristics of the projector; and, controlling the projector, using the computing device, to project based on the virtual location, the virtual orientation and the virtual lens characteristics of the virtual camera.

The three-dimensional environment can comprise a physical object, the system further can comprise a memory storing a virtual model of the physical object, and the method can further comprise: determining a respective location and respective orientation of the physical object relative to a physical origin of the three-dimensional environment by comparing the virtual model to the cloud of points; setting a virtual location and virtual orientation of the virtual model in the virtual three-dimensional environment with respect to a virtual origin, related to the physical origin, to match the respective location and the respective orientation of the physical object; and, controlling the projector to illuminate the physical object with images adjusted for the virtual location and the virtual orientation of the virtual model. The comparing the virtual model to the cloud of points can comprise an iterative closest point scheme.

The three-dimensional environment can comprise one or more of: a physical object on a surface; a curved surface; and an irregular surface.

The one or more structured light patterns can comprise a sequence of structured light patterns configured to uniquely sequentially illuminate different portions of the three-dimensional environment.

The one or more structured light patterns can comprise a sequence of images of horizontal bars and vertical bars, the bars either halving or doubling in width within the sequence and in each direction.

The one or more structured light patterns can comprise one or more of: a sequence of images of bars; black and white images; colored images; and images of sinusoids.

The method can further comprise determining the given positions of the at least two cameras relative to the three-dimensional environment, and set a physical origin of the three-dimensional environment by: acquiring at least one image of a known target pattern positioned in the three-dimensional environment from each of the at least two cameras; and, comparing the at least one image of the known target pattern with a representation of the known target pattern.

The method can further comprise generating the cloud of points representing the three-dimensional environment using the two-dimensional mapping and the given positions of the at least two cameras relative to the three-dimensional environment using triangulation.

The method can further comprise determining the location, the orientation and the lens characteristics of the projector relative to the three-dimensional environment, from the cloud of points by matching a plurality of points from the cloud of points to respective areas of one or more of the structured light patterns.

The virtual location, the virtual orientation and the virtual lens characteristics can comprise pose data comprising: a three-dimensional position of the virtual camera in the virtual three-dimensional environment with respect to a virtual origin, related to the physical origin; a pitch value; a yaw value; a roll value; an offset value; and a throw value.

Another aspect of the specification provides a computer-readable medium storing a computer program, wherein execution of the computer program is for: in system comprising: a computing device; a projector; and at least two cameras, each of the projector and the at least two cameras mounted relative to a three-dimensional environment with respective fields of view at least partially overlapping a projection area of the projector on the three-dimensional environment, controlling the projector, using the computing device, to sequentially project one or more structured light patterns configured to uniquely illuminate different portions of the three-dimensional environment; acquiring one or more respective images from each of the at least two cameras, using the computing device, while the projector is projecting the one or more structured light patterns, each of the one or more respective images correlated with a given respective structured light pattern; generating, using the computing device, a two-dimensional mapping of the different portions of the three-dimensional environment between a projector space and a camera space by processing the respective images and correlated given respective structured light patterns; generating, using the computing device, a cloud of points representing the three-dimensional environment using the two-dimensional mapping and given positions of the at least two cameras relative to the three-dimensional environment; determining, using the computing device, a location, an orientation and lens characteristics of the projector relative to the three-dimensional environment, from the cloud of points; positioning, using the computing device, a virtual camera relative to a virtual three-dimensional environment, corresponding to the three-dimensional environment, a virtual location, a virtual orientation and virtual lens characteristics of the virtual camera respectively matching the location, the orientation and the lens characteristics of the projector; and, controlling the projector, using the computing device, to project based on the virtual location, the virtual orientation and the virtual lens characteristics of the virtual camera. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
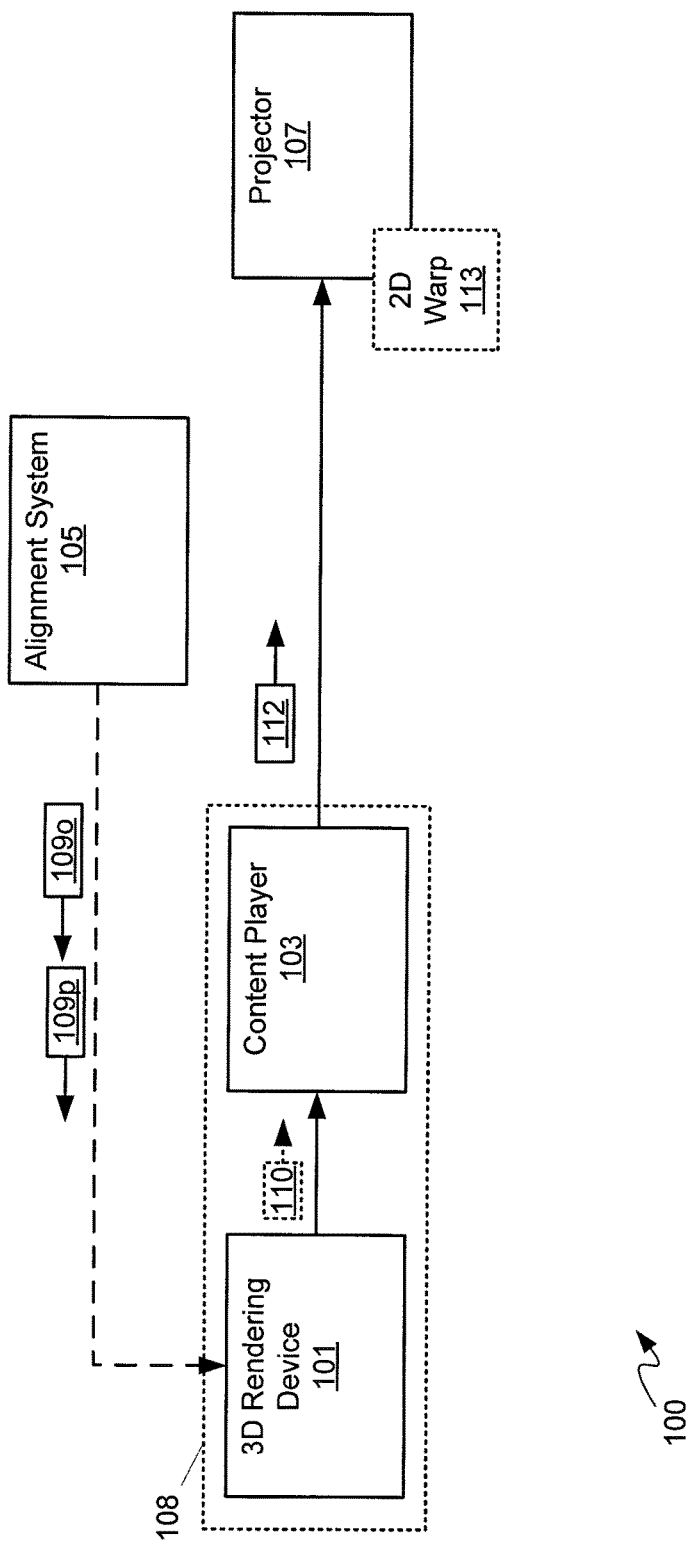
FIG. 1 depicts a projection system, according to non-limiting implementations.

FIG. 1 depicts a system 100 comprising: a 3D ("three-dimensional") rendering device 101 (interchangeably referred to hereafter as device 101); a content player 103; an alignment system 105; and a projector 107. In general, device 101 is in communication with content player 103 and alignment system 105, and content player 103 is in communication with projector 107. As depicted, device 101 and content player 103 are combined into one device 108, however in other implementations device 101 and content player 103 are separate devices. Alignment system is configured to generate pose data 109p comprising a virtual location, a virtual orientation and virtual lens characteristics of a virtual camera corresponding to projector 107, and communicate pose data 109p to device 101, as described in further detail below. Device 101 can generate rendered image data 110 from pose data 109p, for example by rendering existing image data (not depicted) for projection by projector 107. In FIG. 1, solid lines connecting components show flow of image and/or video data there between, while the stippled line connecting alignment system 105 to device 101 and/or device 108 shows flow of pose data 109p and object data 109o there between. Pose data 109p can also be referred to as calibration data as pose data 109p represents a calibration of system 100 to account for a position of projector 107 and/or positions of objects upon which images are to be projected. Object data 109o generally comprises a virtual location and virtual orientation of a virtual model of an object in a virtual three-dimensional environment, with respect to a virtual origin, that corresponds to a physical three-dimensional environment where the object is located.

When device 101 and content player 103 are separate, device 101 communicates image data 110 to content player 103, which processes and/or "plays" image data 110 by producing projection data 112 suitable for processing and projection by projector 107. For example, image data 110 can include, but is not limited to, an AVI file, a series of JPG files, a PNG file, and the like. Projection data 112 can include, but is not limited to, HDMI data, VGA data, and/or video transport data. When device 101 and content player 103 are combined in device 108, device 109 can render projection data 112 (e.g. video data) in real-time without producing image data 110. In any event, projection data 112 is communicated to projector 107 by content player 103 where projection data 112 is used to control projector 107 to project images based thereupon, for example onto a three-dimensional object.

Device 101 generally comprises an image generator and/or renderer, for example a computing device, a server and the like, configured to generate and/or render images as image data 110. Such image data 110 can include, but is not limited to, still images, video and the like. Furthermore, while not depicted device 101 can be in communication with, and/or comprise, an image generator and/or a memory storing data from which image data 110 can be generated and/or rendered. Alternatively, device 101 can generate image data 110 using algorithms, and the like, for generating images.

Content player 103 comprises a player configured to "play" and/or render image data 110; for example, when image data 110 comprises video data, content player 103 is configured to play and/or render the video data by outputting projection data 112 for projection by projector 107. Hence, content player 103 can include, but is not limited to a video player, a video processing device, a computing device, a server, and the like. However, as described above, when device 101 and content player 103 are combined as device 108, rendering of image data 110 can be eliminated and device 108 renders projection data 112 without producing image data 110.

Alignment system 105 comprises any suitable combination of projectors (including projector 107), cameras (not depicted in FIG. 1), and computing devices configured to one or more of: automatically determine parameters of projector 107; and automatically determine a location and orientation of a three-dimensional object onto which images are to be projected. Non-limiting implementations of alignment system 105 will be described below with reference to FIGS. 2 to 19.

Projector 107 comprises a projector configured to project projection data 112, including but not limited to a digital projector, a cinema projector, an LCOS (Liquid Crystal on Silicon) based projector, a DMD (digital multimirror device) based projector and the like. Furthermore, while only one projector 107 is depicted, system 100 can comprise a plurality of projectors 107, each configured to project respective projection data comprising, for example, portions of larger tiled image to be projected.

As depicted system 100 further comprises one or more 2D ("two-dimensional") warping devices and/or modules 113, for example at projector 107 (though such a warping device can be present at content player and/or as a stand-alone device) When present, projection data 112 can be warped by warping device 113, for example by moving and/or adjusting pixels within projection data 112, to adjust projection data 112 for projection by projector 107 onto a three-dimensional object. However, as alignment system determines pose data 109p and communicates such to device 101 (and/or device 108), warping module 113 can be unused, optional and/or eliminated from system 100. Indeed, use of warping module 113 represents how images were processed according to the prior art and the presence of warping module 113 is obviated by virtue of alignment system 105 providing device 101 (and/or device 108) with pose data 109p. However, in some implementations, warping module 113 can be used to make small changes to projection of images onto a physical object, for example when a virtual model of the object used to produce the images does not precisely match the physical object.

While each of device 101, content player 103, alignment system 105, and projector 107 are depicted as distinct components, in other implementations, respective portions of one or more of device 101, content player 103, alignment system 105, and projector 107 and can be implemented within the same device (e.g. device 108) and/or processing resources can be shared there between. For example, while not depicted, system 100 comprises one or more processors, one or more memories and one or more communication interfaces, for example a processor, memory and communication interface for each of device 101, content player 103, alignment system 105, and projector 107 and/or to be shared among device 101, content player 103, alignment system 105, and projector 107. Indeed, in general, components of system 100, as depicted, represent different functionality of a projection system where: parameters of projector 107 can be automatically determined, and automatically adjusted when projector 107 moves; a location and orientation of a three-dimensional object onto which images are to be projected can be automatically determined (and automatically adjusted when the three-dimensional object moves); and images are adjusted for projection onto the three-dimensional object.

Figure 2:
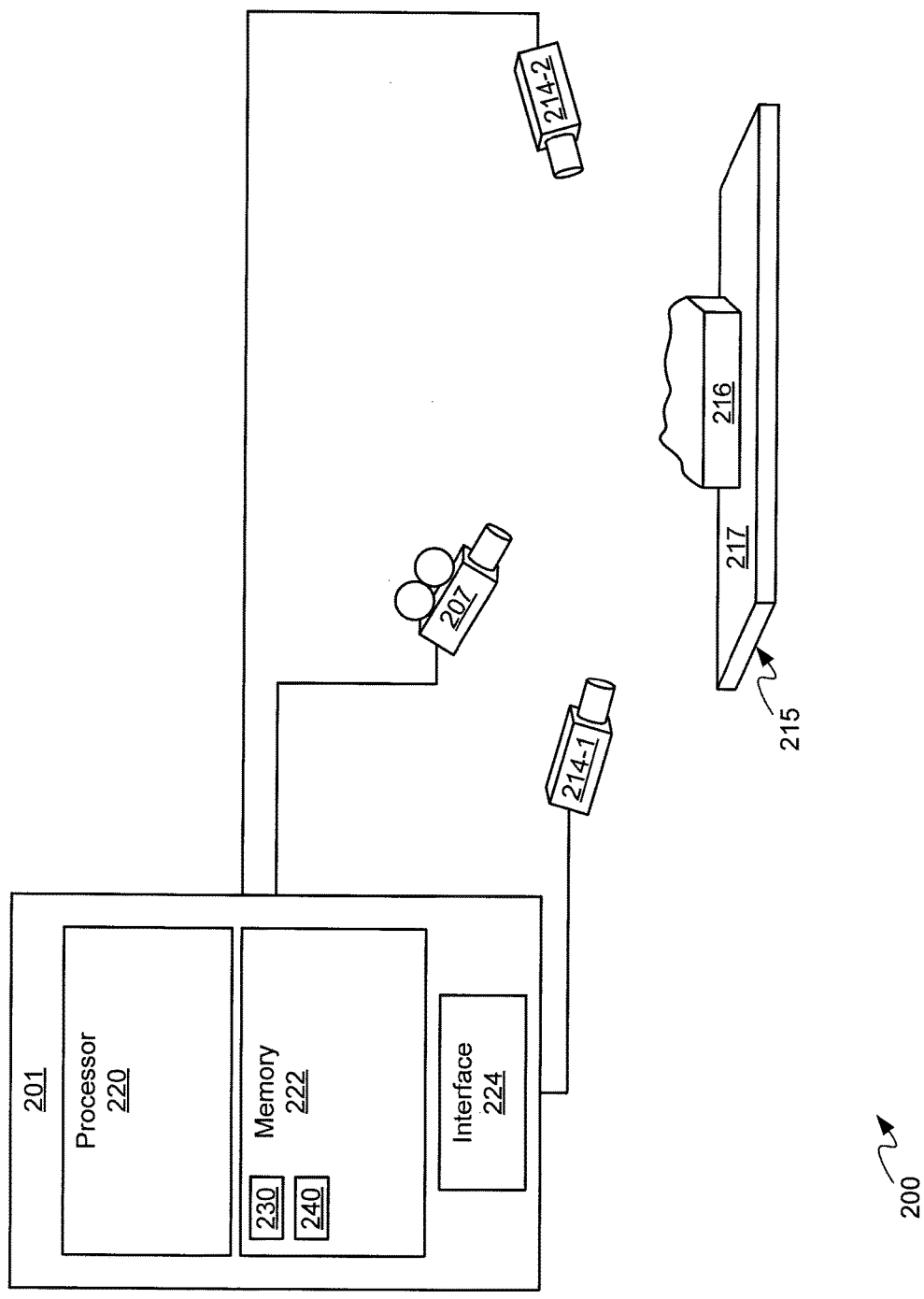
FIG. 2 depicts a system for automatic alignment and projection mapping, which can be used in the system of FIG. 1, according to non-limiting implementations.

Attention is next directed to FIG. 2 which depicts a system 200 for automatic alignment and projection mapping. Indeed, alignment system 105 can comprise system 200, and furthermore components of system 100 can comprise components of system 200 as desired. System 200 comprises a computing device 201, a projector 207; and at least two cameras 214-1, 214-2 (interchangeably referred to hereafter, collectively, as cameras 214 and, generically, as a camera 214), each of projector 207 and at least two cameras 214 mounted relative to a three-dimensional environment 215 with respective fields of view of cameras 214 at least partially overlapping a projection area of projector 207 on three-dimensional environment 215. In particular, each of cameras 214 is aimed at environment 215 at different positions and/or different orientations, such that cameras 214, taken together, are viewing environment 215 in stereo.

As depicted, three-dimensional environment 215 comprises a three-dimensional and /or physical object 216 on a flat surface 217, however, in other implementations, three-dimensional environment 215 (interchangeably referred to hereafter as environment 215) can comprise one or more of: a physical object on a surface; a curved surface; an irregular surface, and the like. Indeed, environment 215 can comprise any objects and/or environment having depth onto which images are to be projected.

In general, projector 107 can comprise projector 207, alignment system 105 can comprise computing device 201, projector 207 and cameras 214, and any of device 101 and content player 103 can comprise at least a portion of computing device 201, for example when resources are shared amongst device 101, content player 103 and alignment system 105. Furthermore, while only one projector 207 is depicted, system 200 can comprise more than one projector.

Each camera 214 can comprise one or more of a digital camera, a CCD (charge coupled device) and the like. While only two cameras 214 are depicted, system 200 can comprise more than two cameras each aimed, at environment 215 at a different positions and/or different orientations and/or to provide one or more stereo views of environment 215. Furthermore, as described above, respective fields of view of each of cameras 214 at least partially overlap a projection area of projector 207 in environment 215, however the more overlap there between the more accurate the automatic alignment and/or automatic projection mapping described below with respect to FIGS. 3 to 5, and 7 to 19, provided that cameras 214 have sufficient stereo separation to generate accurate stereo data. In general, a substantial portion of least object 216 (and/or other three-dimensional features of environment 215) is in a field of view of each of cameras, and further a projection area of projector 207 includes a substantial portion of at least object 216 (and/or the other three-dimensional features of environment 215). In some instances such overlap is in a range of greater than about 50% overlap, while in other implementations, such overlap is in a range of greater than about 75% overlap. It is further appreciated that that shadows can occur in the field of view of cameras 214 and/or in the projection area of projector 207.

Computing device 201, interchangeably referred to hereafter as device 201 can comprise any suitable computing device, including but not limited to a graphics processing unit (GPU), a graphics processing device, a graphics processing engine, a video processing device, a personal computer (PC), a server, and the like, and generally comprises a processor 220, a memory 222 and a communication interface 224 (interchangeably referred to hereafter as interface 224) and optionally any suitable combination of input devices and display devices.

Processor 220 can be implemented as a plurality of processors, including but not limited to one or more central processors (CPUs) and/or one or more processing units and/or one or more graphic processing units (GPUs); either way, processor 220 comprises a hardware element and/or a hardware processor of device 201). Processor 220 is configured to communicate with memory 222 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 201 as described herein are typically maintained, persistently, in memory 222 and used by processor 220 which makes appropriate utilization of volatile storage during the execution of such programming instructions. Those skilled in the art recognize that memory 222 is an example of computer readable media that can store programming instructions executable on processor 220. Furthermore, memory 222 is also an example of a memory unit and/or memory module and/or a non-volatile memory.

In particular, memory 222 stores an application 230 that, when processed by processor 220, enables processor 220 and/or computing device 201 to: control the projector 207 to sequentially project one or more structured light patterns configured to uniquely illuminate different portions of three-dimensional environment 215; acquire one or more respective images from each of the at least two cameras 214 while projector 207 is projecting the one or more structured light patterns, each of the one or more respective images correlated with a given respective structured light pattern; generate a two-dimensional mapping of the different portions of the three-dimensional environment 215 between a projector space and a camera space by processing the respective images and correlated given respective structured light patterns; generate a cloud of points representing the three-dimensional environment 215 using the two-dimensional mapping and given positions of the at least two cameras 214 relative to the three-dimensional environment 215.

In some implementations, application 230, when processed by processor 220, can further enable processor 220 and/or computing device 201 to: determine a location, an orientation and lens characteristics of the projector 207 relative to the three-dimensional environment 215, from the cloud of points; and, position a virtual camera relative to a virtual three-dimensional environment, corresponding to three-dimensional environment 215, a virtual location, a virtual orientation and virtual lens characteristics of the virtual camera respectively matching the location, the orientation and the lens characteristics of projector 207; and, control the projector 207 to project based on the virtual location, the virtual orientation and the virtual lens characteristics of the virtual camera.

In other implementations, as depicted, memory 222 further stores a virtual model 240 of physical object 216. In these implementations, application 230, when processed by processor 220, can further enable processor 220 and/or computing device 201 to: determine a respective location and respective orientation of physical object 216 relative to a physical origin of the three-dimensional environment 215 by comparing virtual model 240 to the cloud of points; set a virtual location and virtual orientation of the virtual model 240 in the virtual three-dimensional environment with respect to a virtual origin, related to the physical origin, to match the respective location and the respective orientation of the physical object 216; and control projector 207 to illuminate physical object 216 with images adjusted for the virtual location and virtual orientation of the virtual model 240.

In yet further implementations, application 230, when processed by processor 220, can further enable processor 220 and/or computing device 201 to: determine the given positions of at least two cameras 214 relative to three-dimensional environment 215, and set a physical origin of three-dimensional environment 215 by: acquiring at least one image of a known target pattern positioned in three-dimensional environment 215 from each of at least two cameras 214; and, comparing the at least one image of the known target pattern with a representation of the known target pattern.

Interface 224 comprises any suitable wired or wireless communication interface configured to communicate with projector 207 and cameras 214 (and any of device 101, content player 103, alignment system 105, and device 108) in a wired and/or wireless manner as desired.

Figure 3:
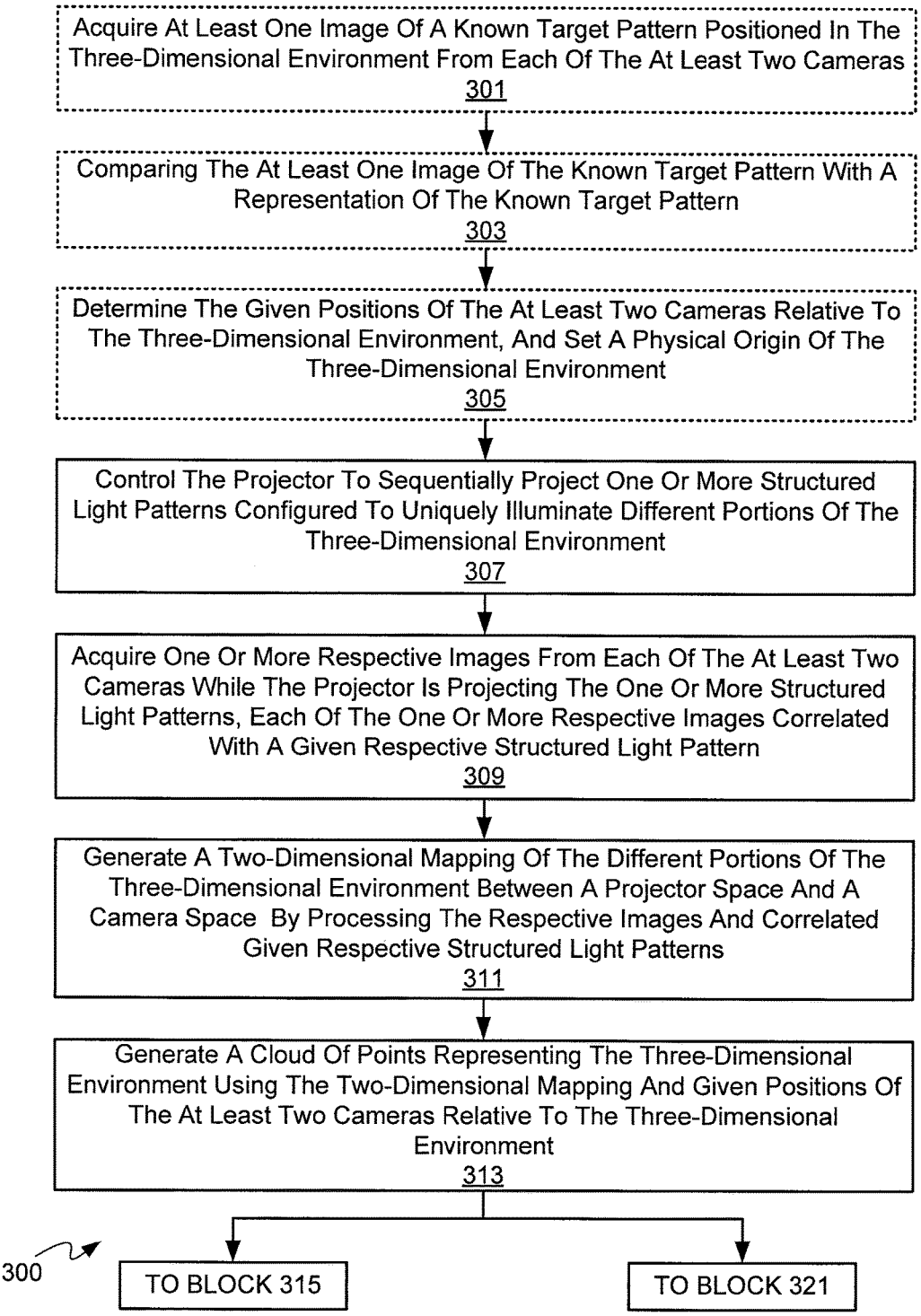
FIG. 3 depicts a method for automatic alignment and projection mapping, according to non-limiting implementations.
Figure 4:
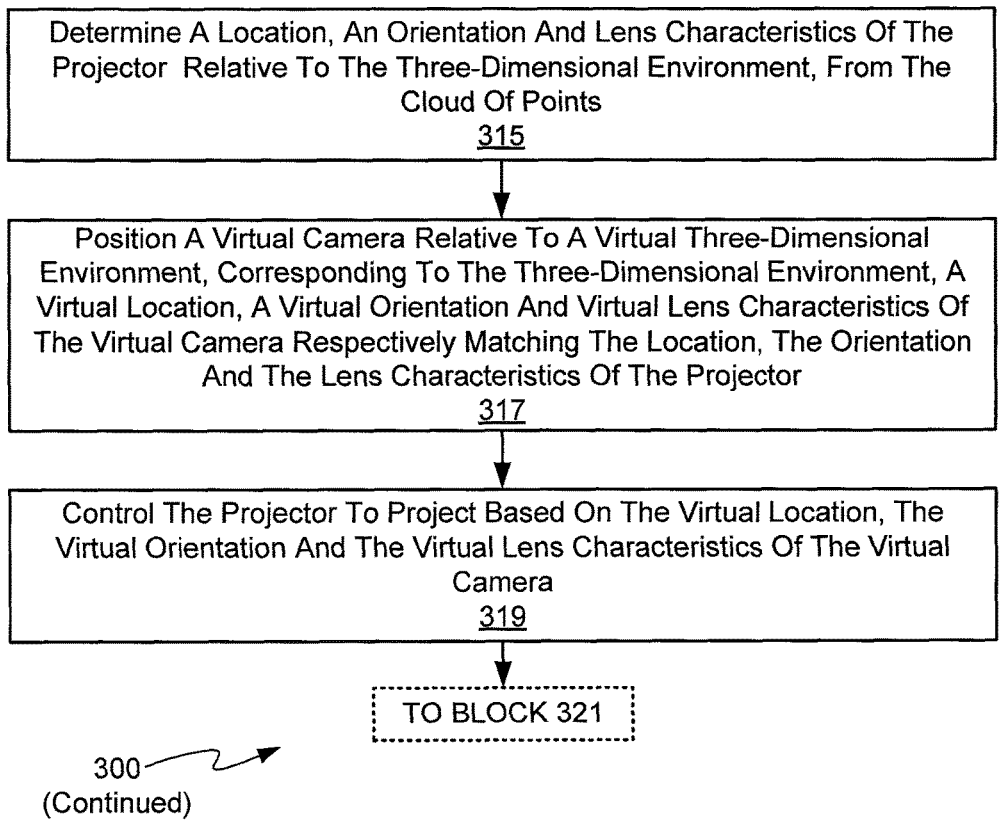
FIG. 4 depicts further blocks of the method of FIG. 3, according to non-limiting implementations.
Figure 5:
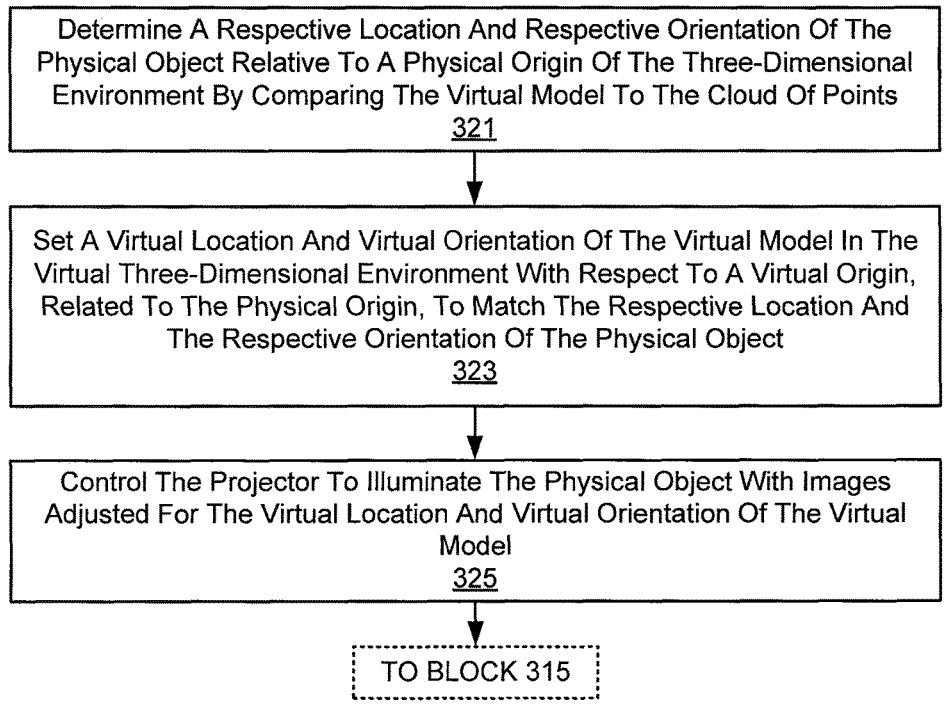
FIG. 5 depicts further blocks of the method of FIG. 3, according to non-limiting implementations.

Attention is now directed to FIG. 3, FIG. 4 and FIG. 5 which depict a flowchart of a method 300 for automatic alignment and projection mapping, according to non-limiting implementations. In order to assist in the explanation of method 300, it will be assumed that method 300 is performed using system 200, and specifically by processor 220 of device 201, for example when processor 220 processes application 230. Indeed, method 300 is one way in which system 200 and/or device 201 can be configured. Furthermore, the following discussion of method 300 will lead to a further understanding of device 201, and system 200 and its various components. However, it is to be understood that system 200 and/or device 201 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 200 as well. Furthermore, while computing device 201 is described as implementing and/or performing each block of method 300, it is appreciated that each block of method 300 occurs using processor 220 processing application 230.

Blocks 301 to 305 are first described, which together comprise a method for automatically determining given positions of cameras 214 from a known target pattern. However, in other implementations, given positions of cameras 214 can be determined another way, for example manually, and stored at memory 222, and blocks 301 to 305 are not implemented.

In any event, at block 301, device 201 acquires at least one image of a known target pattern positioned in three-dimensional environment 215 from each of the at least two cameras 214. At block 303, device 201 compares the at least one image of the known target pattern with a representation of the known target pattern. And, at block 305, device 201 determines the given positions of at least two cameras 214 relative to three-dimensional environment 215, and sets a physical origin of three-dimensional environment 215.

Figure 6:
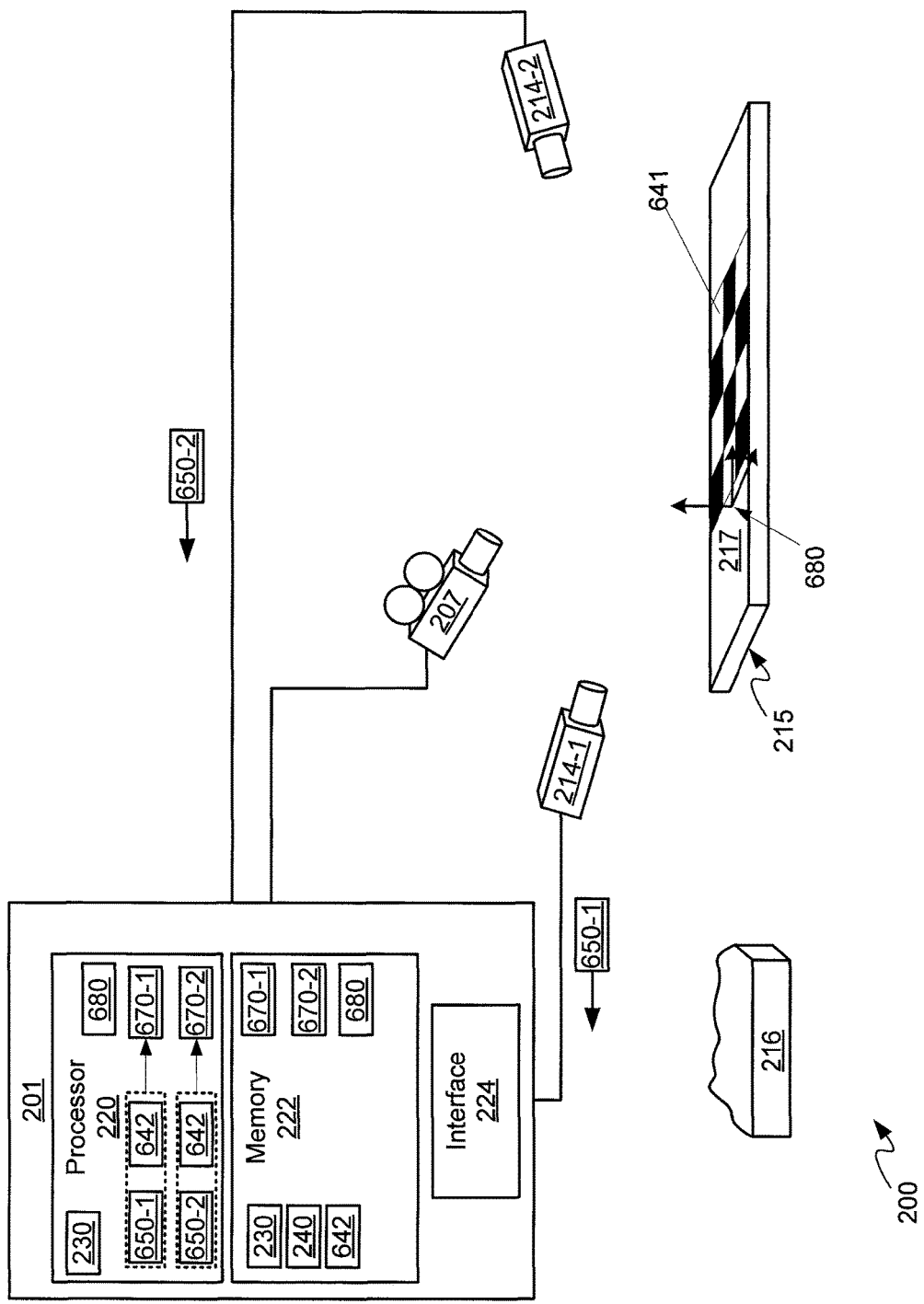
FIG. 6 depicts the system of FIG. 2 being used to determine locations of cameras relative to a three-dimensional environment, according to non-limiting implementations.

Blocks 301 to 305 are now described with reference to directed to FIG. 6, which is substantially similar to FIG. 2, with like elements having like numbers. In FIG. 6, object 216 has been removed from environment 215, and a known target pattern 641, for example a sheet with a chequerboard printed thereupon, has been placed on surface 217. Furthermore, in these implementations, memory 222 has been provisioned with a representation 642 of known target pattern 641, for example image data representing the same chequerboard as target pattern 641. In any event, each of cameras 214 capture a respective image 650-1, 650-2 of known target pattern 641 which are received at device 201 (e.g. at block 301). Processor 220 compares each of images 650-1, 650-2 to representation 642 to (e.g. at block 303, as represented by the stippled lines around images 650-1, 650-2 and representation 642 within processor 220 in FIG. 6) to determine (e.g. at block 307) a respective given position 670-1, 670-2 of each of cameras 214-1, 214-2, as well as an origin 680 of environment 215, for example by comparing size, surfaces, feature orientations and shapes of feature of images 650-1, 650-2 to representation 642, and using image processing techniques. Furthermore, respective given positions 670-1, 670-2 and origin 680 are then stored at memory 222. Given position 670-1, 670-2 will be interchangeably referred to hereafter, collectively, as given positions 670 and, generically, as a given position 670. Each given position 670 can comprise one or more of a respective location, a respective orientation, and the like of each of cameras 214 relative, for example, to origin 680, as well as respective lens characteristics. In particular, each given position can comprise one or more of: a respective three-dimensional position of a respective camera 214 with respect to origin 680; a pitch value of a respective camera 214; a yaw value of a respective camera 214; a roll value of a respective camera 214; an offset value of a respective camera 214; and respective lens characteristics of a respective camera 214 which can include, but is not limited to, a focal length of a respective camera 214, a lens distortion of a respective camera 214, and the like. However, the given position of each camera 214 can be defined using any suitable combination of parameters.

In general, origin 680 is assigned to a given point of environment 215, for example a point relative to a position of target pattern 641 on surface 217. While origin 680 is depicted in FIG. 6 as "0" position of an orthogonal coordinate system on surface 217, it is appreciated that origin 680 is merely a point assigned to a location of environment 215, and any coordinate system can be associated therewith.

Attention is again directed to FIG. 3 to continue discussion of method 300 and specifically blocks 307 to 313, which together comprise a method for modelling three-dimensional environment 215 with a cloud of points, which will be used in each of blocks 315 to 319, depicted in FIG. 4, and blocks 321 to 325, depicted in FIG. 5; Each of blocks 315 to 319 and blocks 321 to 325 will be described in further detail below.

At block 307, device 201 controls projector 207 to sequentially project one or more structured light patterns configured to uniquely illuminate different portions of three-dimensional environment 215. At block 309, device 201 acquires one or more respective images from each of at least two cameras 214 while projector 207 is projecting the one or more structured light patterns, each of the one or more respective images correlated with a given respective structured light pattern. At block 311, device 201 generates a two-dimensional mapping of the different portions of three-dimensional environment 215 between a projector space and a camera space by processing the respective images and correlated given respective structured light patterns. At block 313, device 201 generates a cloud of points representing three-dimensional environment 215 using the two-dimensional mapping and given positions 670 of at least two cameras 214 relative to the three-dimensional environment 215.

Blocks 307 to 313 are now described with reference to FIG. 7, FIG. 8, FIG. 9, FIG. 10, FIG. 11, and FIG. 12, with FIGS. 7, 9 and 11 substantially similar to FIG. 2, with like elements having like numbers. Furthermore, in FIGS. 7 to 12 it is assumed that object 216 has been placed back on surface 217 (e.g. relative to FIG. 6), and that the location of object 216 on surface 217 is arbitrary.

Attention is next directed to FIG. 7, which depicts device 201 controlling projector 207 (e.g. at block 307) to sequentially project one or more structured light patterns 701-1, 701-2 (interchangeably referred to hereafter, collectively, as patterns 701 and, generically, as a pattern 701) configured to uniquely illuminate different portions of three-dimensional environment 215, as described with reference to FIG. 8. In particular, patterns 701 are generated by device 201 when processor 220 processes application 230; alternatively, representations (not depicted) of patterns 701 can be stored at memory 222. Alternatively, patterns 701 can be generated by projector 207.

Figure 7:
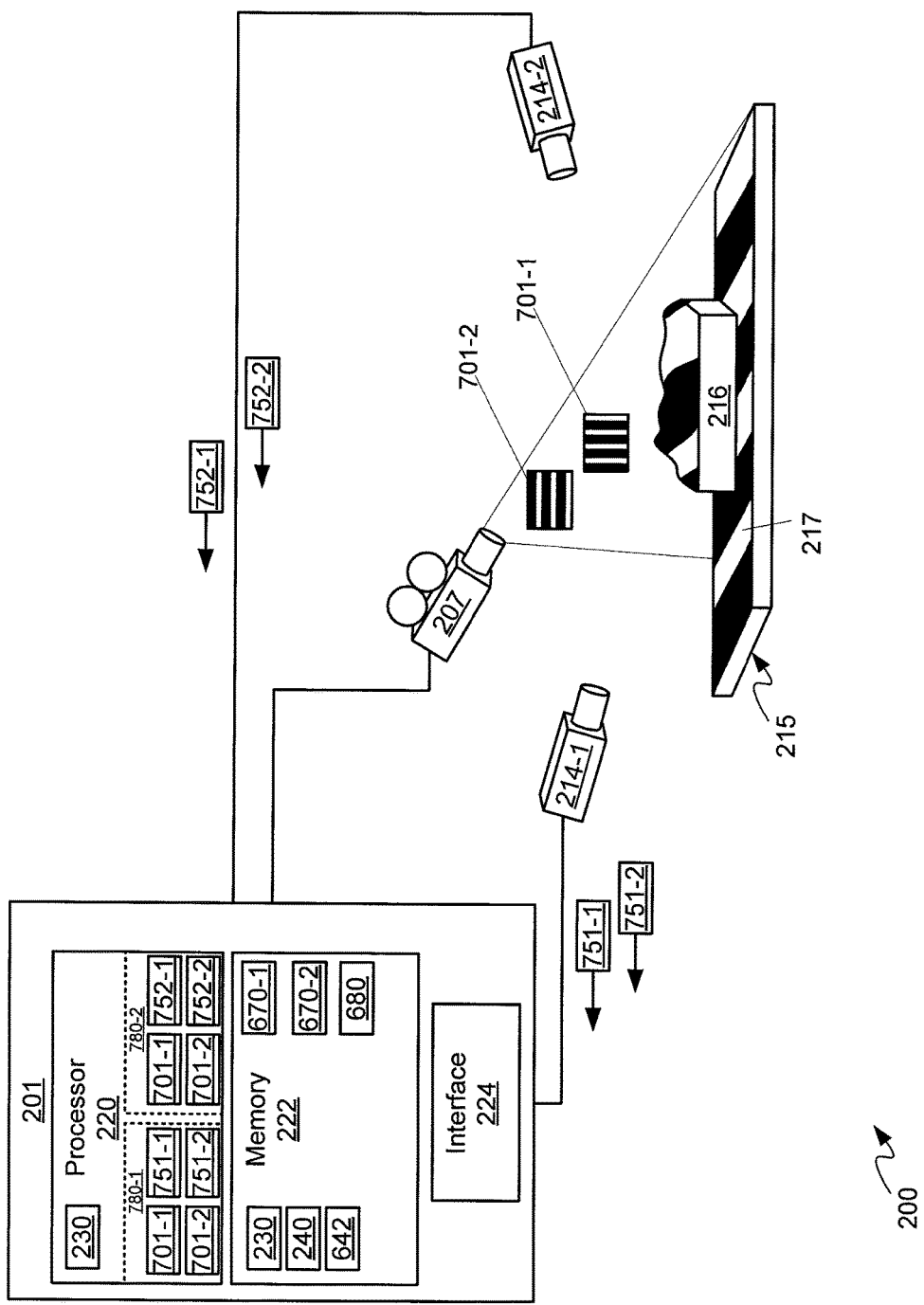
FIG. 7 depicts the system of FIG. 2 being used to project structured light patterns onto the three-dimensional environment, according to non-limiting implementations.
Figure 8:
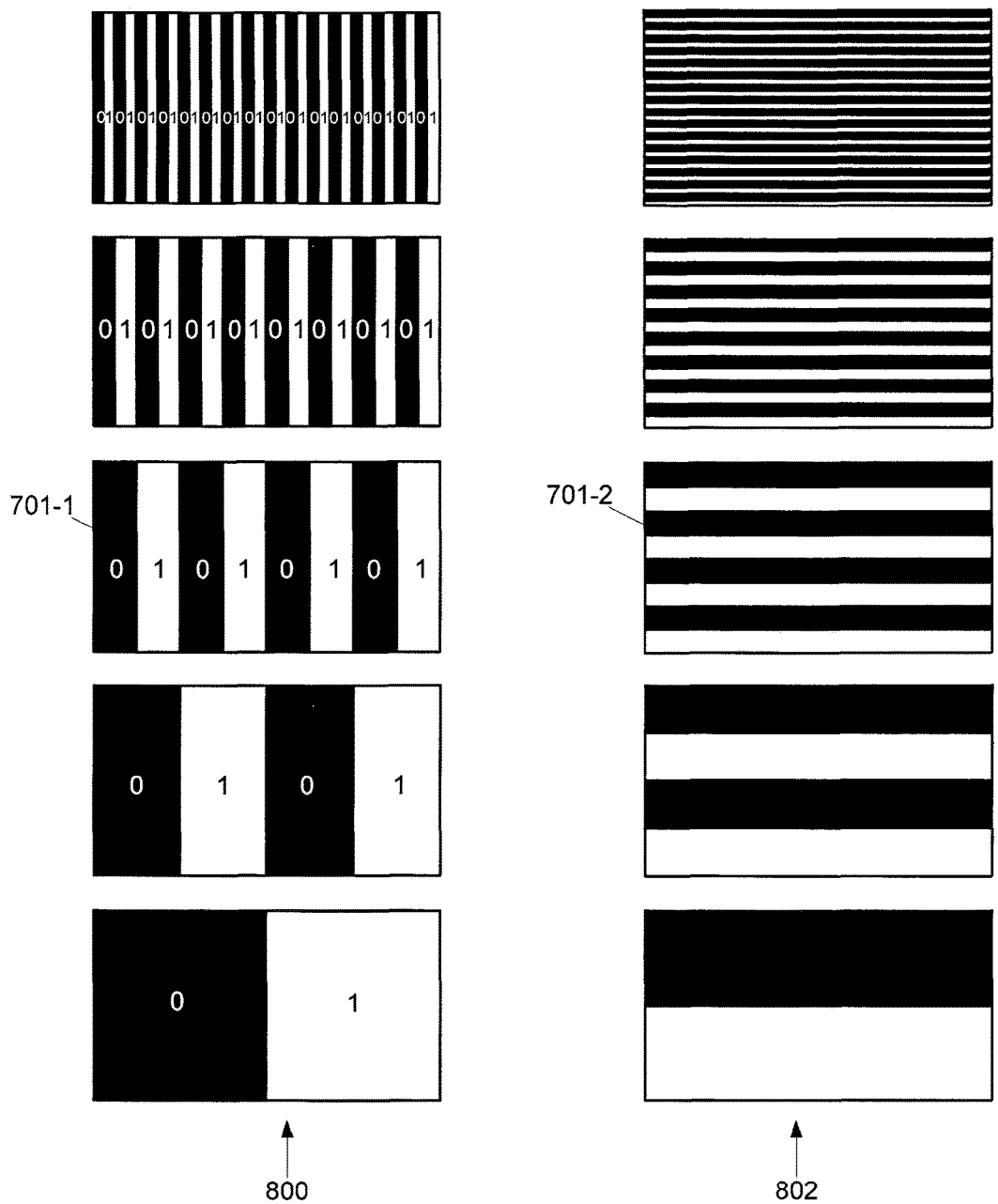
FIG. 8 depicts examples of sequences of structured light patterns used in the system of FIG. 2, according to non-limiting implementations.

Furthermore, FIG. 7 depicts pattern 701-2 illuminating environment 215; specifically, pattern 701-1 comprises four parallel vertical bars which are projected onto object 216 and surface 217, with at least a portion of three of the four parallel vertical bars being projected onto object 216 and hence assume a shape of object 216. While not depicted it is also assumed that pattern 701-2 illuminates environment 215 in a similar manner though pattern 701-2 comprises four parallel horizontal bars. It is appreciated, however, that the terms "horizontal" and "vertical" as used herein are used with reference to the figures, and not with reference to an absolute references frame, such as the ground and/or the Earth.

In FIG. 7, while each of patterns 701 is projected by projector 207, each of cameras 214 is controlled to acquire an image of environment 215. For example, while projector 207 is projecting pattern 701-1, camera 214-1 is controlled to acquire image 751-1 and camera 214-2 is controlled to acquire image 752-1; similarly, while projector 207 is projecting pattern 701-2, camera 214-1 is controlled by device 201 to acquire image 751-2 and camera 214-2 is controlled by device 201 to acquire image 752-2. Each of images 751-1, 751-2, 752-1, 752-2 are received at device 201 from cameras 214 (e.g. at block 309). Hence, as device 201 is both controlling projector 207 to project patterns 701 and simultaneously controlling cameras 214 to acquire images 751-1, 751-2, 752-1, 752-2, device 201 can correlate patterns 701 with images 751-1, 751-2, 752-1, 752-2, as well as with cameras 214, as represented by groupings 780-1, 780-2 of data at processor 220 in FIG. 7. Images 751-1, 751-2, 752-1, 752-2 will be interchangeably referred to hereafter, collectively, as images 751, 752 and, generically, as an image 751 or an image 752. In essence, pairs of images 751, 752 acquired by each camera 214 for a given structured light pattern represent a stereo view of the given structured light pattern.

It is further appreciated that, as depicted, each of patterns 701 is merely representative of a sequence of structured light patterns projected on environment 215 by projector 207, the sequence configured to uniquely sequentially illuminate different portions of three-dimensional environment 215. For example, attention is directed to FIG. 8 which depicts a first sequence 801 of structured light patterns that includes pattern 701-1 and a second sequence 802 of structured light patterns that includes pattern 701-2.

In particular, sequences 801, 802 comprise sequences of images of vertical bars (e.g. sequence 801) and horizontal bars (e.g. sequence 802), the bars either halving or doubling in width within each sequence 801, 802, and in each direction in each sequence 801, 802. For example, in sequence 801, and starting from the bottom of FIG. 8, a first image comprises one vertical black bar on the left hand side and one vertical white bar of equal size on the right hand side, each of the bars being about equal width. In the next image (second from bottom), the left hand black bar has halved, with the remaining portion being replaced with a white bar; and the right hand white bar has also halved, with the remaining portion being replaced with a black bar, while maintaining a black/white/black/white sequence in the image. The process continues in the next image and so on until the top image is reached with 32 bars (16 black alternating with 16 white). A similar process occurs in the horizontal bars of sequence 802.

Furthermore, each of the black bars and the white bars can represent a binary identification scheme detectable using cameras 214 with, for example, white bars representing "1" and the black bars representing "0", as depicted in sequence 801. While the "1" and "0" depicted on each bar are not projected, when images 751, 752 of each image in sequence 801 are captured by cameras 214, and processed by processor 220, white areas of images 751, 752 can be interpreted as "1" by device 201 and black areas of images 751, 752 can be interpreted as "0" by device 201. Such an identification can be made for portions of environment 215 illuminated by each of the bars.

For example, a portion of environment 215 that is illuminated by the right-most white bar of the top image in sequence 801, will also be illuminated by each of the right-most white bars in the other images of sequence 801, and so on for the remaining images in sequence 801. Hence, this portion can be represented by a numerical sequence (1, 1, 1, 1, 1), indicating that this portion was sequentially illuminated by white bars. Similarly, a portion of environment 215 represented that is illuminated by the right-most black bar of the top image in sequence 801, will also be illuminated by each of the right-most white bars in the other images of sequence 801. Hence, this portion can be represented by a numerical sequence (1, 1, 1, 1, 0) (assuming that the bottom image in sequence 801 is represented by the first number in the sequence), indicating that this portion was sequentially illuminated by four white bars and then a black bar. However, the images in each sequence 801, 802 can be projected in any order and indeed images from sequences 801, 802 can be interlaced with each other.

Each numerical sequence for each portion can hence represent bits in a binary numbering scheme, which are unique to each portion being sequentially illuminated in a unique manner due to the halving of the bars from image to image as described above, and due to starting with one black bar and one white bar in a first image.

This scheme can be repeated for the horizontal bars of sequence 802.

In addition, portions of environment 215 can be represented by intersections of horizontal bars and vertical bars when images 751 are correlated for camera 214-1, and when images 752 are correlated for camera 214-2. Hence, for example, a portion of environment 215 sequentially illuminated by sequences 801, 802, and specifically the bottom right corner of each of sequences 801, 802 can be represented by a numerical sequence ((1, 1, 1, 1, 1), (1, 1, 1, 1, 1)), while an adjacent portion (e.g. to the left) can be represented by ((1, 1, 1, 1, 0), (1, 1, 1, 1, 1)). Alternatively presuming that the last number in each numerical sequence is a smallest bit, each of these numerical sequences can be converted to a number and/or a pair of numbers; for example, ((1, 1, 1, 1, 1), 1, 1, 1, 1)) can be converted to (31, 31) (e.g. 16+8+4+2+1=31), while ((1, 1, 1, 1, 0), (1, 1, 1, 1, 1)) can be converted to (30, 31) (e.g. 16+8+4+2+0=30).

A portion of environment 215 sequentially illuminated by sequences 801, 802, and specifically the top left corner of each of sequences 801, 802 can be represented by a numerical sequence ((0, 0, 0, 0, 0), (0, 0, 0, 0, 0)), or (0, 0). Hence, a 32 by 32 grid of portions can be detected in images acquired by cameras 214 (e.g. in stereo) when projector 207 is projecting the structured light patterns.

Furthermore, while five images are depicted in each sequence 801, 802, each sequence 801, 802 can comprise any number of images, with higher numbers of images leading to higher numbers of portions of environment 215 being detected in images acquired by cameras 214. However, a maximum achievable resolution of areas of environment 215 can be determined, at least in part, by a resolution of projector 207. For example, when a resolution of projector 207 is 1920×1080 (e.g. horizontal by vertical), 11 structured light patterns in sequence 802 can be projected by projector 207 in a sequence (e.g. continuing the halving technique described in FIG. 8), to decode values up to 2048 (e.g. 11 bits or $2^{11}$, in other words, a resolution achievable with 11 structured light patterns), as 1920 is between 1024 (e.g. 10 bits or $2^{10}$, in other words, a resolution achievable with 10 structured light patterns) and 2048. Similarly, 11 structured light patterns can also be used for sequence 801, as 1080 is also between 1024 and 2048.

However, the maximum achievable resolution of areas of environment 215 can also be determined by a resolution of cameras 214; in other words, while a very fine structured light pattern of 2048 bars can be projected, cameras 214 may not be capable of discerning between such fine bars. Indeed, in a successful prototype it was found that 9 structured patterns (e.g. $2^9$ or 512 bars, i.e. 9 bits of resolution in each direction) in each sequence 801, 802 were enough to achieve acceptable results. Indeed, higher resolutions may not be discernible by eyes of the average human.

Furthermore, other structured light patterns are within the scope of present implementations. For example, rather than sequences of vertical and horizontal bars, a single structured light pattern comprising a plurality of areas of different colours in the vertical and horizontal directions could be used, presuming that cameras 214 can distinguish between the different colours. Similarly, a single structured light pattern comprising a plurality of areas of different shades of grey in the vertical and horizontal directions could be used, presuming that cameras 214 can distinguish between the different shades of grey. In yet a further alternative implementation, sequences of images of sinusoids can be used. Indeed, other schemes of one or more structured light patterns that will enable portions of environment 215 to be uniquely identified are within the scope of present implementations.

Hence, in some implementations, the one or more structured light patterns of block 307 can comprise a sequence of images of horizontal bars and vertical bars, the bars either halving or doubling in width within the sequence and in each direction. Alternatively, the one or more structured light patterns of block 307 can comprise one or more of: a sequence of images of bars; black and white images; colored images; and images of sinusoids.

Figure 9:
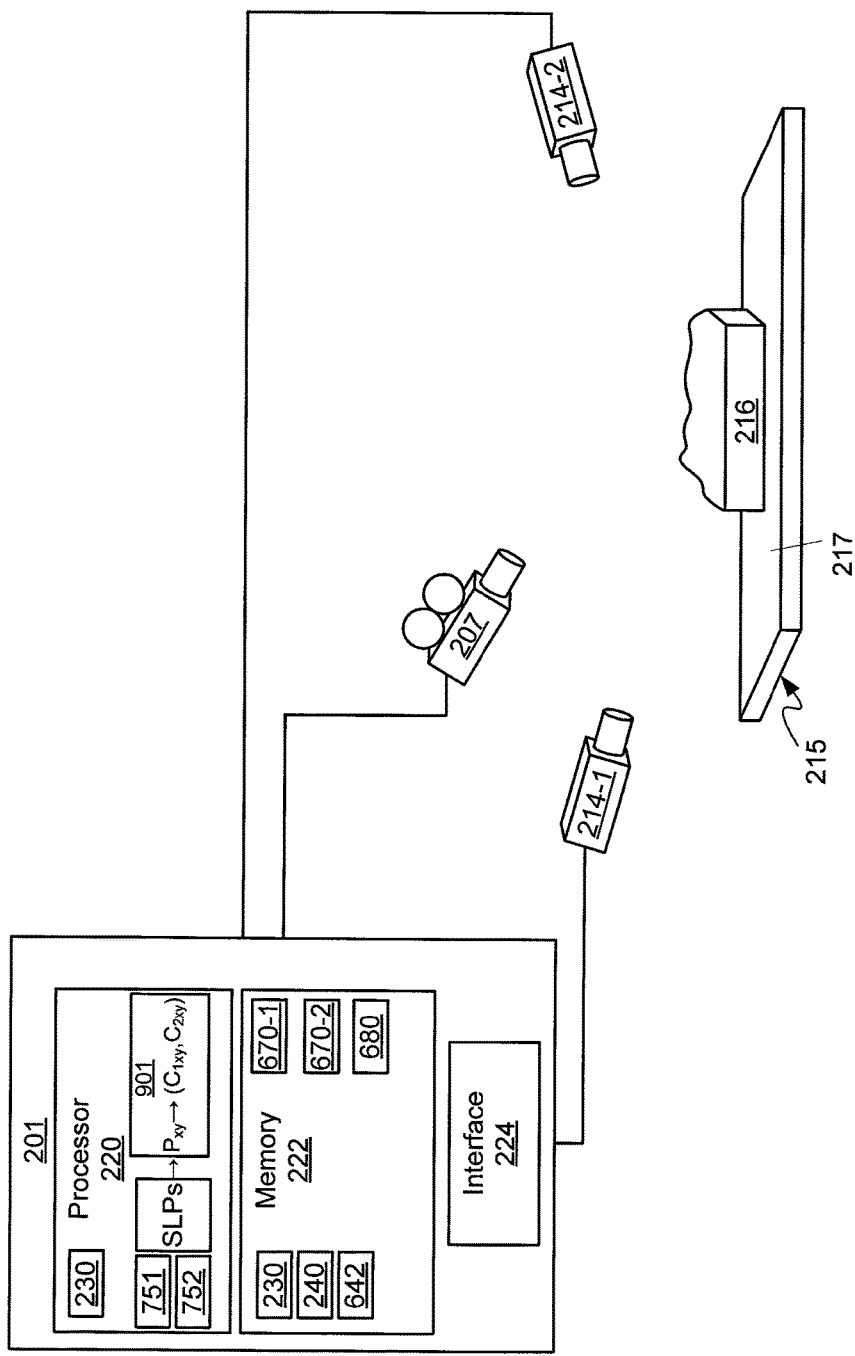
FIG. 9 depicts the system of FIG. 2 being used to generate a mapping between projector space and camera space, according to non-limiting implementations.

Attention is next directed to FIG. 9 where device 201 is depicted generating a stereo two-dimensional mapping 901 (i.e. at block 311) of the different portions of the three-dimensional environment 215 between a projector space $P_{xy}$ and a camera space ($C_{1xy}$, $C_{2xy}$)) by processing the respective images 751, 752 and correlated given respective structured light patterns (indicated by "SLPs" in FIG. 9). In other words, images 751, 752 as depicted in FIG. 9 comprise a plurality of images acquired from cameras 214 while given respective structured light patterns (e.g. sequences 801, 802) were projected onto environment 215.

Figure 10:
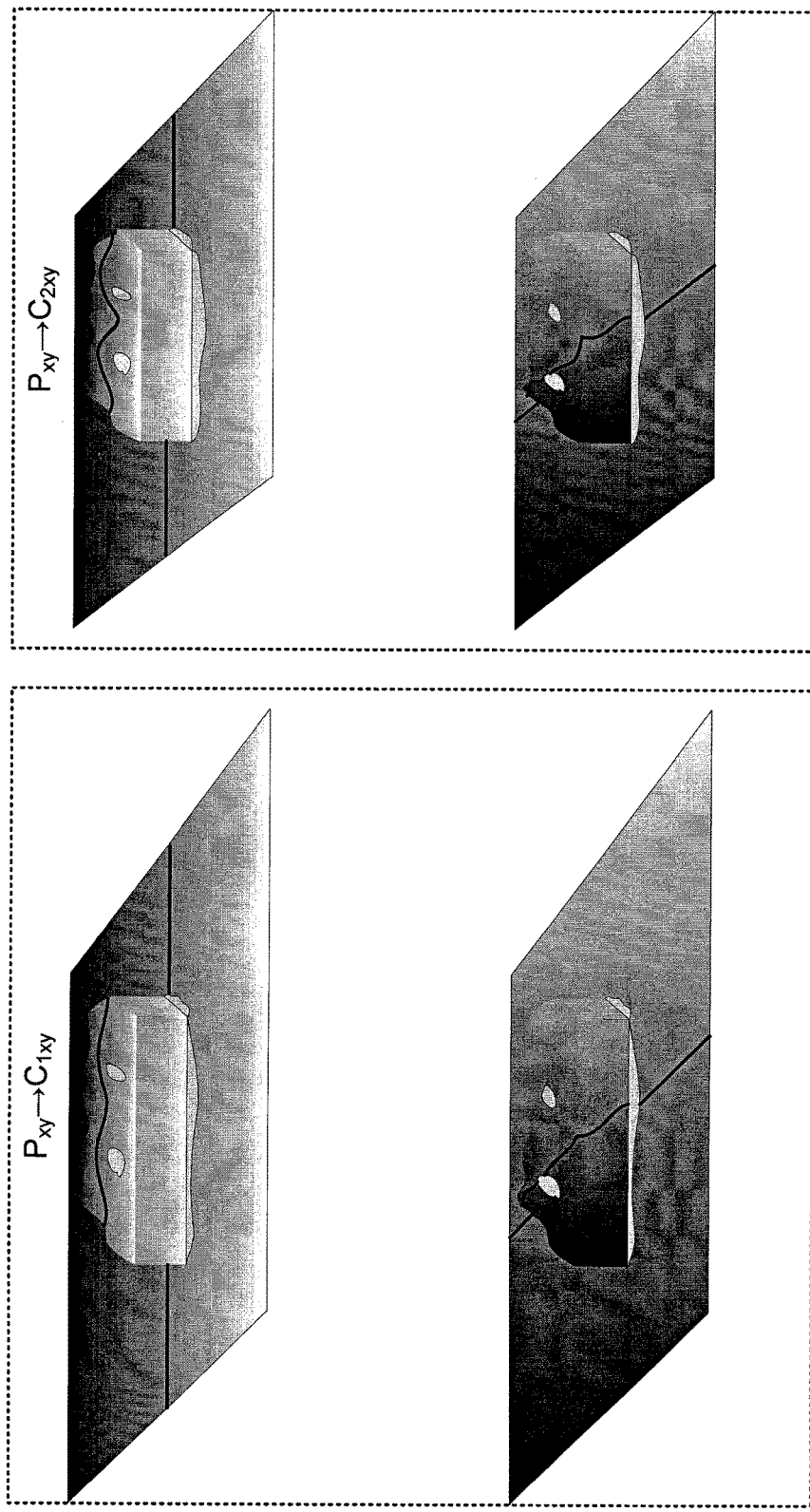
FIG. 10 depicts examples of graphical representations of the mapping generated in FIG. 9, according to non-limiting implementations.

Mapping 901 generally comprises a two-dimensional table of values that maps areas in projector space (e.g. portions on a structured light pattern projected by projector 207, as described above with respect to FIG. 8) to detected corresponding areas in images 751, 752 (as also described above with respect to FIG. 8). Mapping 901 can graphically represented, as depicted in FIG. 10. Specifically FIG. 10 depicts: graphical representations between projector space $P_{xy}$ to camera space $C_{1xy}$ ($P_{xy} \rightarrow C_{1xy}$) for camera 214-1, and for each of the structured light patterns with horizontal bars (top graphical map) and vertical bars (bottom graphical map); and graphical representations between projector space $P_{xy}$ to camera space $C_{2xy}$ ($P_{xy} \rightarrow C_{2xy}$) for camera 214-2, and for each of the structured light patterns with horizontal bars (top graphical map) and vertical bars (bottom graphical map).

In particular, for each graphical map depicted in FIG. 10, a bold line is drawn showing how the mapping can change with contours of the physical object, otherwise general mapping is shown using shading. Shadows in the mapping are depicted as solid grey areas.

Furthermore, the graphical mappings in a top row of FIG. 10 represent a stereo mapping of environment 215 when vertical bars are projected thereon, and the graphical mappings in a bottom row of FIG. 10 represent a stereo mapping of environment 215 when horizontal bars are projected thereon.

It is appreciated that the graphical mapping in FIG. 10 is merely an example and isn't an exact representation of such a mapping; for instance, as the structured light patterns described with reference to FIG. 8 can be divided into a 32×32 grid, processing of such structured light patterns would result in a 32×1 (and/or 1×32) mapping for each of the graphical maps depicted in FIG. 10, however, as depicted, the shading is continuous as would appear when the resolution of mapping 901 is finer than 32×1 (and/or 32×1). Furthermore the shadows are provided merely to indicate that shadows are possible and are not necessarily representative of locations of actual shadows.

Furthermore, while each graphical mapping for each camera 214 is depicted as a mapping for horizontal bars and as a mapping for vertical bars, the corresponding table $(P_{xy} \rightarrow (C_{1xy}, C_{2xy}))$ can comprise a table that combine the horizontal and vertical mappings into values in an orthogonal coordinate system (and the like).

Graphical representation of mapping 901 as depicted in FIG. 10 for each camera 214, also shows that each of cameras 214 are acquiring images of environment 215 at different positions and/or different orientations, and hence in stereo. As such, using mapping 901, and respective given positions 670 of each of cameras 214, a cloud of points can be generated (e.g. at block 313) representing at least a portion of three-dimensional environment 215, and specifically those portions of environment visible to cameras 214. Put another way, mapping 901 and/or table $(P_{xy} \rightarrow (C_{1xy}, C_{2xy}))$ represent a stereo mapping fields of views of cameras 214 (e.g. camera space) into a projection area of projector 207 (e.g. projector space) for environment 215. Such a mapping 901 can be used to generate a three-dimensional mapping of environment 215, for example when positions 670 of cameras 214 are known.

Figure 11:
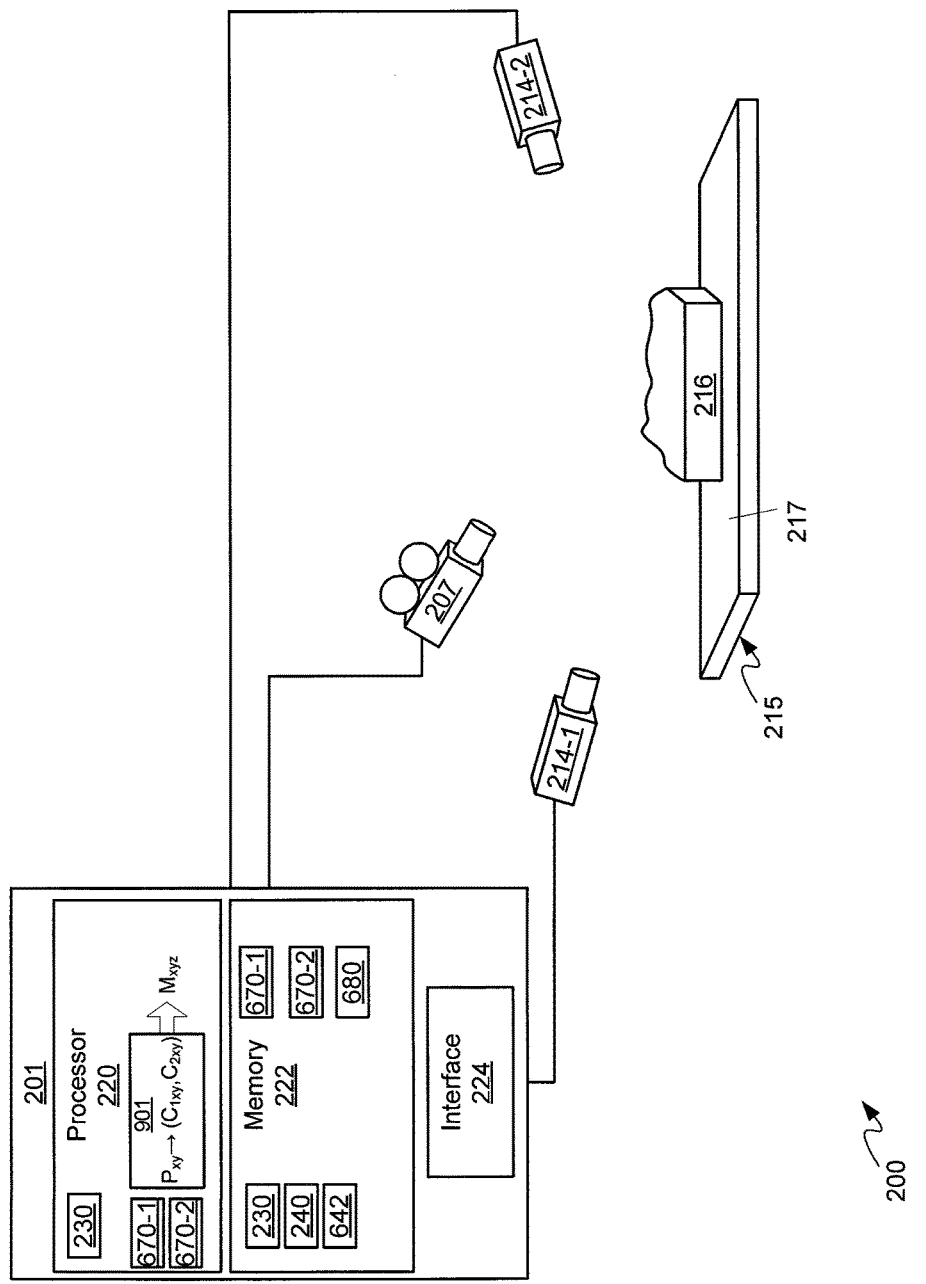
FIG. 11 depicts the system of FIG. 2 being used to generate a cloud of points from the mapping of FIGS. 9 and 10 and locations of cameras, according to non-limiting implementations.

For example, attention is next directed to FIG. 11 which depicts processor 220 generating a cloud of points $M_{xyz}$, from mapping 901 and respective given positions 670 (e.g. at block 313). In other words, as positions 670 of each of cameras 214 are known, and mapping 901 represents two-dimensional representation of stereo views of environment 215, a three-dimensional mapping of environment 215 can be generated, for example in the form of cloud of points $M_{xyz}$. In general, each point in cloud of points $M_{xyz}$, comprises a three-dimensional coordinate of an area of environment corresponding to portions described above with respect to FIG. 8, for example with respect to origin 680. Any suitable technique can be used to generate points $M_{xyz}$, including, but not limited to, triangulation, and the like.

Figure 12:
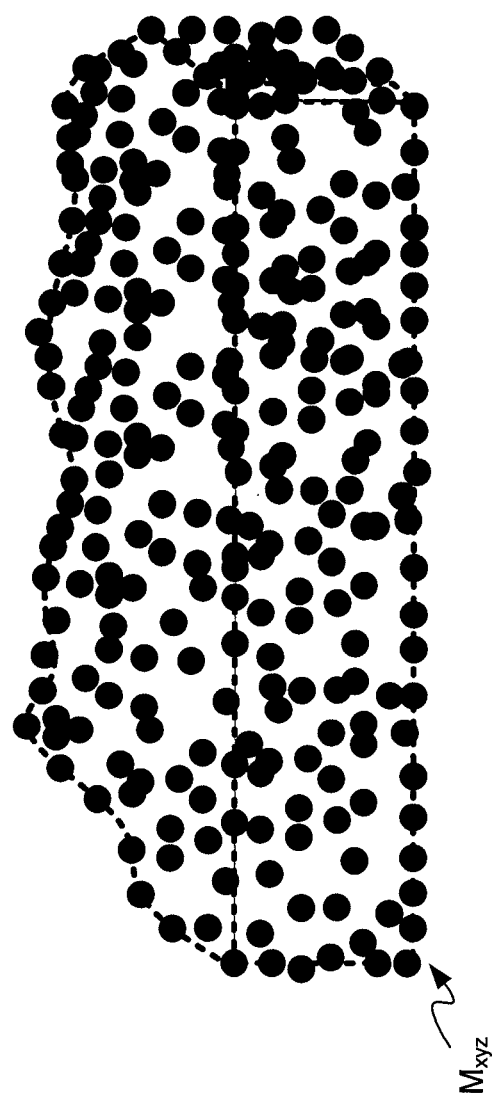
FIG. 12 depicts an example of the cloud of points generated in FIG. 11, according to non-limiting implementations.

For example, attention is directed to FIG. 12, which depicts a graphical representation of an example cloud of points $M_{xyz}$ representing object 216 (depicted using stippled lines). While a resolution of greater than 32×32 is depicted, when the structured light patterns of FIG. 8 are used, the cloud of points $M_{xyz}$ will be less dense than as depicted in FIG. 12. Furthermore, interpolation, and filtering techniques can be used to respectively increase the density of cloud of points $M_{xyz}$, and filter out points that are outside the boundaries of object 216. In addition, while cloud of points $M_{xyz}$ depicted in FIG. 12 represent object 216 only, in practise an entirety of environment 215 can be represented by cloud of points $M_{xyz}$, including surface 217.

Returning briefly to FIG. 3, once cloud of points $M_{xyz}$ is generated, method 300 can proceed to block 315 and/or to block 321. For example, with reference to FIG. 4, blocks 315 to 319 comprise a method of positioning a virtual camera, corresponding to projector 207 relative to a virtual three-dimensional environment, corresponding to three-dimensional environment 215, using the cloud of points $M_{xyz}$; specifically, a virtual location, a virtual orientation and virtual lens characteristics of the virtual camera is set to respectively match the location, the orientation and the lens characteristics of projector 207, as determined from the cloud of points $M_{xyz}$, which is then used to generate images for projector 207 to project within environment 215. With reference to FIG. 5, blocks 321 to 325 comprise a method of determining a location and orientation of object 216 so that images can be generated for projection thereupon. Blocks 315 to 319, and blocks 321 to 325 can be performed in any order and/or in parallel; for example, after block 319, method 300 can proceed to block 321 and/or after block 325, method 300 can proceed to block 315.

In particular, and with reference to FIG. 4, at block 315, device 201 determines a location, an orientation and lens characteristics of projector 207 relative to three-dimensional environment 215, from the cloud of points $M_{xyz}$. At block 317, device 201 positions a virtual camera relative to a virtual three-dimensional environment, corresponding to three-dimensional environment 215, a virtual location, a virtual orientation and virtual lens characteristics of the virtual camera respectively matching the location, the orientation and the lens characteristics of projector 207. And, at block 319, device 201 controls projector 207 to project based on the virtual location, the virtual orientation and the virtual lens characteristics of the virtual camera. It is appreciated that blocks 301 to 319 occur without use of virtual model 240; hence, for these blocks virtual model 240 is optional.

However, presuming that memory 222 stores virtual model 240 of physical object 216, and with reference to FIG. 5, at block 321, device 201 determines a respective location and respective orientation of physical object 216 relative to physical origin 680 of three-dimensional environment 215 by comparing virtual model 240 to cloud of points $M_{xyz}$. At block 323, device 201 sets a virtual location and virtual orientation of virtual model 240 in the virtual three-dimensional environment with respect to a virtual origin, related to physical origin 680, to match the respective location and the respective orientation of physical object 216. And, at block 325, device 201 controls projector 207 to illuminate physical object 216 with images adjusted for the virtual location and virtual orientation of the virtual model.

Blocks 315 to 319 are now described with reference to FIG. 13, FIG. 14, FIG. 15 and FIG. 16, with FIGS. 13, 15 and 16 substantially similar to FIG. 11 (and/or FIG. 2), with like elements having like numbers.

Figure 13:
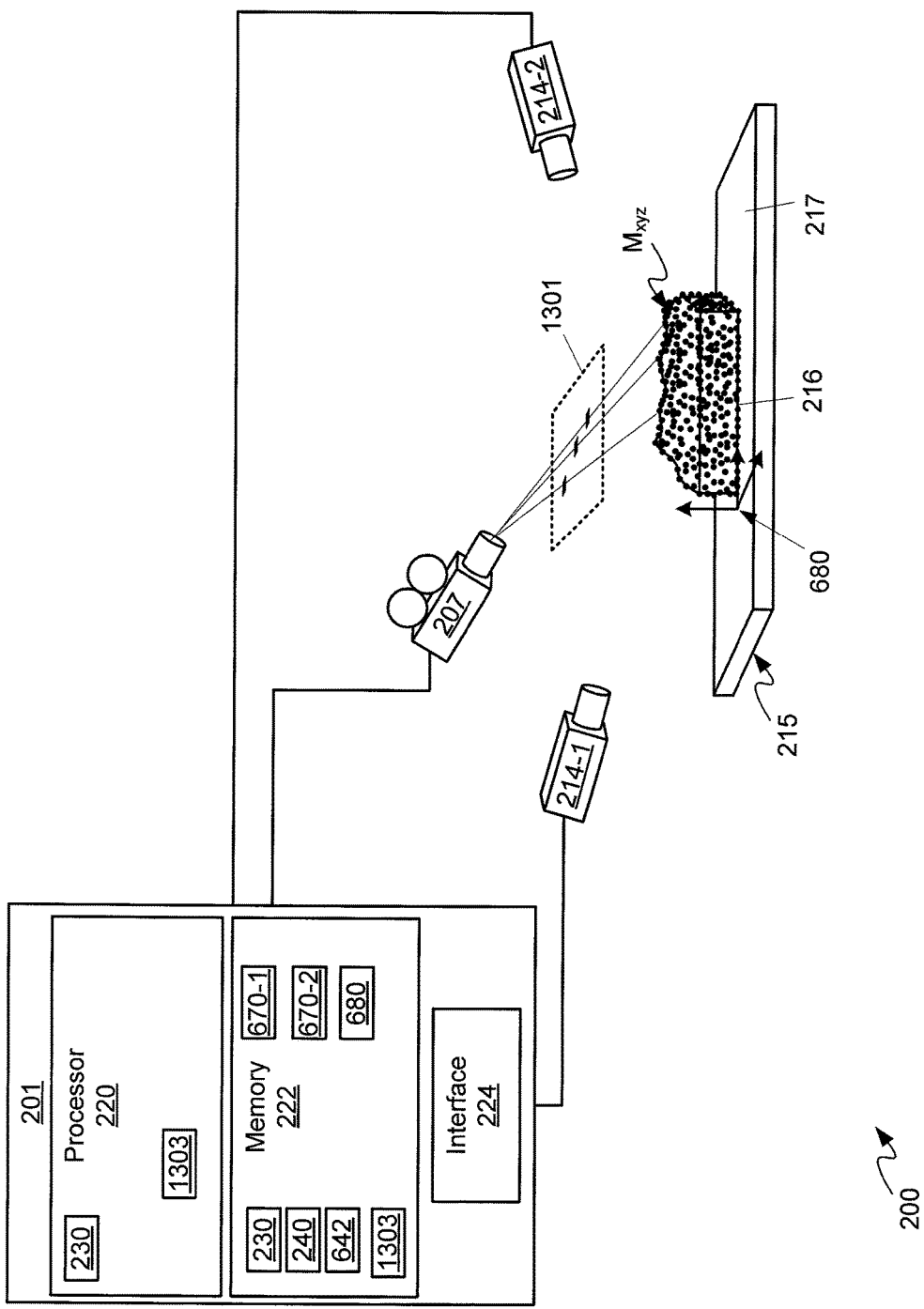
FIG. 13 depicts the system of FIG. 2 being used to determine a location, an orientation and lens characteristics of the projector relative to the three-dimensional environment, from the cloud of points, according to non-limiting implementations.

In FIG. 13, which depicts an implementation of block 315, cloud of points $M_{xyz}$ is depicted as being overlaid on environment 215 relative to origin 680, however it is appreciated that such a representation occurs only within processor 220 and/or memory 222. Furthermore, also depicted in FIG. 13 is a representational pattern 1301 showing locations of three areas of intersections of structured light patterns of FIG. 8 (though it as assumed that pattern 1301 comprises a 32×32 grid), the three areas corresponding to three points of cloud of points $M_{xyz}$. As device 201 can determine which points of cloud of points $M_{xyz}$ correspond to the areas of pattern 1301, a location, orientation and lens characteristics (shown as parameters 1303 in FIG. 13) of projector 207 relative to the three-dimensional environment 215 can be derived from the cloud of points $M_{xyz}$ by matching a plurality of points from cloud of points $M_{xyz}$ to respective areas of one or more of the structured light patterns previously projected by projector 207, and as described with reference to FIG. 8.

In general, while three points cloud of points $M_{xyz}$ are depicted in FIG. 13 as being used to determine the location, the orientation and the lens characteristics of projector 207, in practise increasing the number of points used increases the accuracy of the results, and enables more parameters to be determined (e.g. more parameters can be solved for); for example, the number of points used to accurately solve for location, orientation and lens characteristics of projector 207 can be on the order of several thousand, however fewer points can be used to solve for location, orientation and lens characteristics of projector 207.

In general, camera calibration techniques, including, but not limited to triangulation techniques, image processing techniques and the like, can be used to align areas of pattern 1301 with corresponding points of cloud of points $M_{xyz}$, to determine a location, orientation and lens characteristics of projector 207 that would result in the points from cloud of points $M_{xyz}$ aligning with the areas of pattern 1301. Once alignment occurs, the resulting location, orientation and lens characteristics of projector 207 can be stored in memory 222 as parameters 1303.

Figure 14:
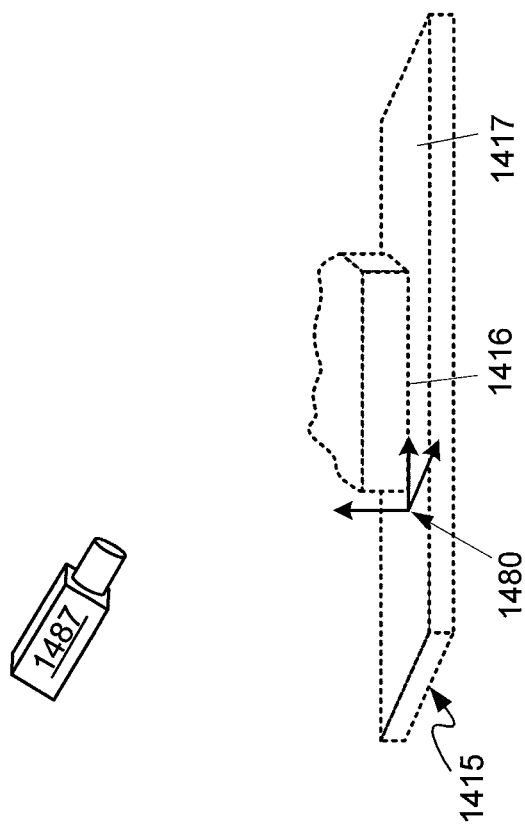
FIG. 14 depicts a positioning of a virtual camera, corresponding to the projector of the system of FIG. 2, relative to a virtual three-dimensional environment, corresponding to the three-dimensional environment of FIG. 2, according to non-limiting implementations.

Attention is next directed to FIG. 14 which depicts a virtual three-dimensional environment 1415 (interchangeably referred to hereafter as environment 1415) corresponding to three-dimensional environment 215. For clarity, environment 1415 is depicted as including a virtual object 1416 corresponding to object 216, and a virtual surface 1417, corresponding to surface 217, however virtual object 1416 and virtual surface 1417 are optional and indeed, heretofore, a respective location, orientation of virtual object 1416 and surface 1417 have not yet been determined. However, virtual environment 1415 comprises a virtual origin 1480 that is related to physical origin 680. For example, in general device 201 assumes a coordinate system for environment 215 having origin 680; hence device 201 sets a similar coordinate system for virtual environment 1415 having an origin 1480 which is either aligned with origin 680 within the similar coordinate systems, or offset by a known amount.

In any event, it is appreciated that virtual environment 1415 is a construct that exists at device 201 (e.g. at processor 220 and/or in memory 222). Furthermore, at block 317, device positions a virtual camera 1487 relative to virtual three-dimensional environment 1415, corresponding to three-dimensional environment 215, a virtual location, a virtual orientation and virtual lens characteristics of the virtual camera respectively matching the location, the orientation and the lens characteristics of projector 207, such matching including any offset between origins 680, 1480. In other words, as depicted in FIG. 15, parameters 1503 of virtual camera 1487 are derived from parameters 1303 of projector 207.

In particular, the virtual location, the virtual orientation and the virtual lens characteristics (e.g. parameters 1303) of virtual camera 1487 can comprise pose data of virtual camera 1487. In some implementations, the pose data of virtual camera 1487can comprise: a three-dimensional position of virtual camera 1487 in virtual three-dimensional environment 1415 with respect to virtual origin 1480, related to physical origin 680; a pitch value; a yaw value; a roll value; an offset value; and a throw value. However, the pose data can be defined using any suitable combination of parameters.

Figure 15:
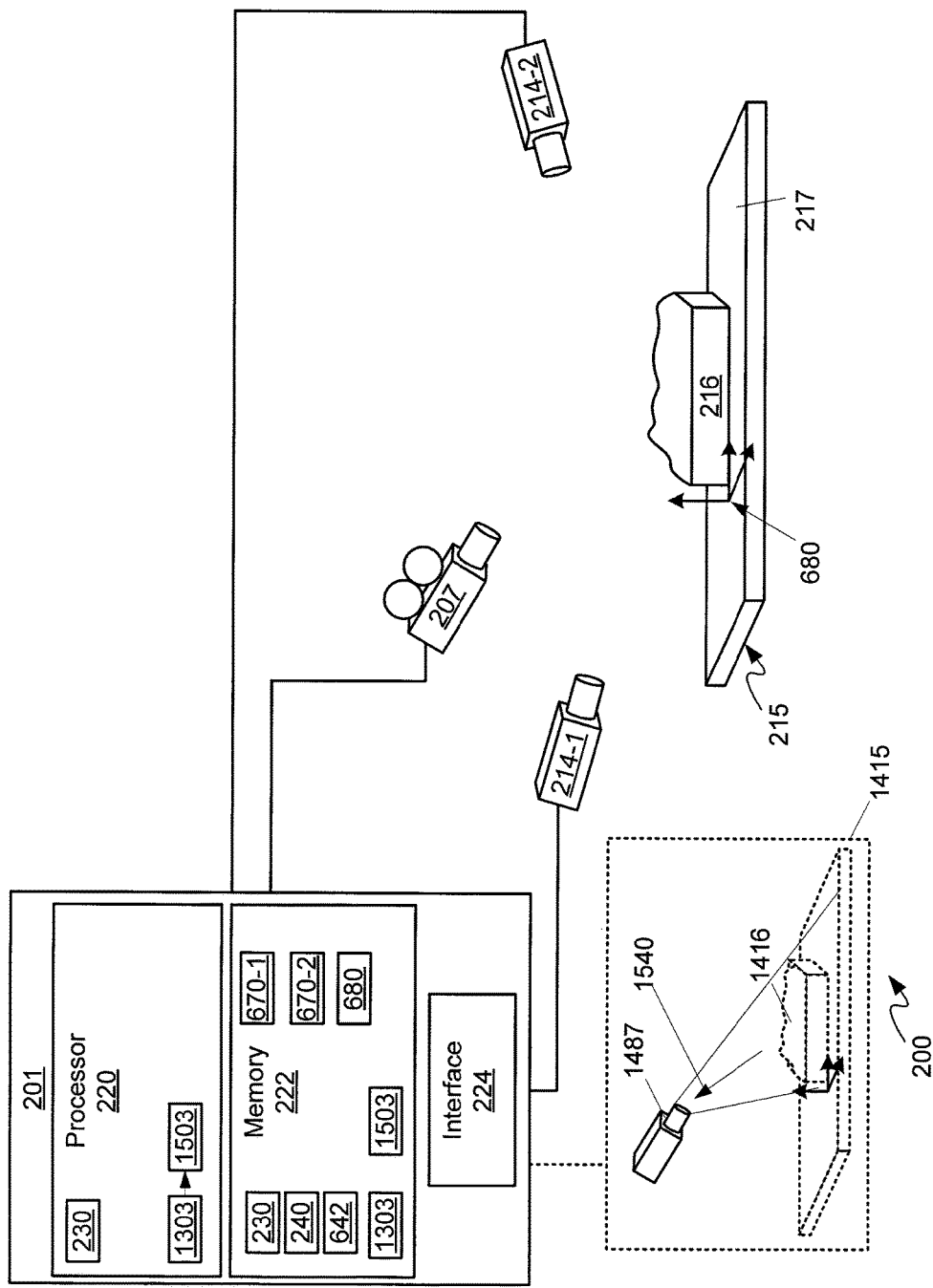
FIG. 15 depicts the system of FIG. 2 setting a virtual location, a virtual orientation and virtual lens characteristics of the virtual camera to respectively matching the location, the orientation and the lens characteristics of the projector, according to non-limiting implementations.

FIG. 15 further depicts virtual environment 1415 of FIG. 14, including virtual camera 1487, "in communication" with device 101, to illustrate that virtual environment 1415 represents a rendering environment that models environment 215 so that images can be generated using the rendering environment with parameters 1503 used to "position" virtual camera 1487 to "view" how object 216, or other objects and/or surfaces, are to appear in physical environment 215.

For example virtual object 1416 can be controlled in virtual environment 1415 to have a particular appearance (e.g. with images rendered on surfaces thereof) using virtual model 240, virtual camera 1487 is positioned using parameters 1503 and then used to "view" virtual object 1416 (e.g. as indicated by arrow 1540), the "view" of which is then used to generate and/or render images for projection by projector 207.

Figure 16:
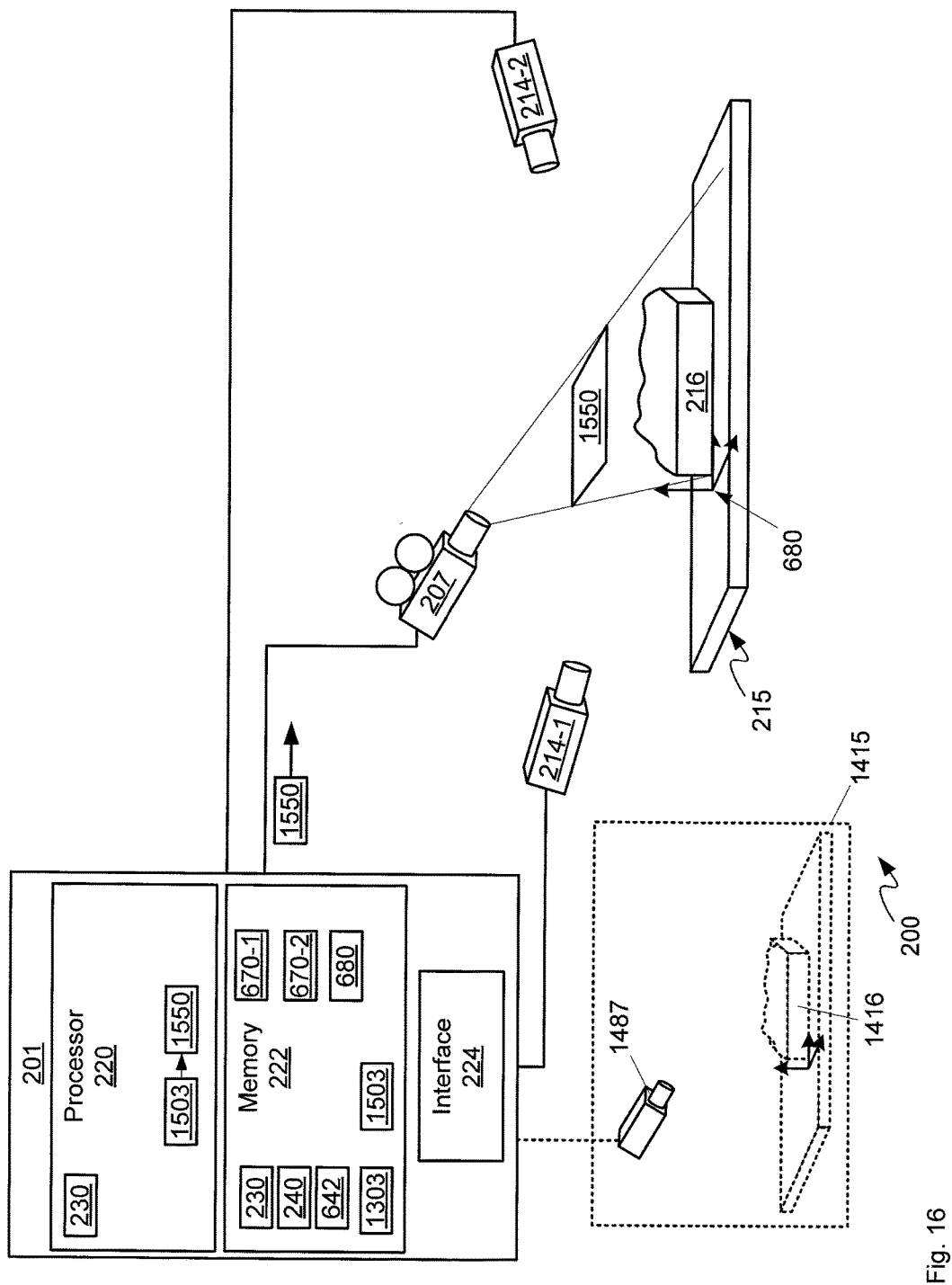
FIG. 16 depicts the projector of the system of FIG. 2 projecting based on the virtual location, the virtual orientation and virtual lens characteristics of the virtual camera according to non-limiting implementations.

Hence, as depicted in FIG.16, parameters 1503 can then be used to control projector 207 to project, for example by rendering images 1550 based on parameters 1503 for projection (e.g. images 1550 represent the "view" and/or field of view of virtual camera 1487), which are then transmitted to projector 207 for projection for example onto object 216. However, while in FIG. 16, object 216 remains positioned at surface 217, in other implementations, object 216 can be removed and/or replaced with other objects, and projection of images by projector 207 can occur without object 216 being present. In other words, rendering of images 1550 for projection into environment 215 are not strictly dependent on virtual model 240, or on object 216. Rather any images projected by projector 207 are based on parameters 1503.

With reference to FIG. 1, parameters 1503 and/or parameters 1703 can be communicated to device 101 and/or device 108 as pose data 109*p* to cause images received from device 101 and/or content player 103 to be rendered for projection into environment 215 without having to further warp the images using warping engine 113, and the like (though use of warping engine 113 is not precluded from present implementations, for example to make small changes to the projected images). In some implementations, once data 1503 is determined (e.g. pose data 109*p*) data 1503 can be automatically applied into a rendering environment (e.g. device 101 and/or device 108) such that image data generated thereby instantly updated; such implementations can be considered real-time or near real-time generation updating of images. However, in other implementations, data 1503 is applied to rendered image data (e.g. in a rendered video pipeline); when data 1503 is applied thereto, such rendered image data is generally re-rendered, which takes time. However, once the re-rendered images are played by content player 103, the alignment of the re-rendered image are similar to that of the real-time or near real-time implementation, and furthermore the image quality is better than that achievable with warping solutions as accurate pixel data from the rendering environment is generated, as opposed to "warping" images using, for example warping engine 113, which generally causes the images to lose quality.

It is further appreciated that blocks 307 to 319 generally show a method for automatically performing projection mapping and determining a location of projector. Hence, the need for using a technician to manually warp images projected by projector 107 has been obviated. Furthermore, blocks 307 to 319 can be repeated for each projector in system 100, or system 200, presuming system 100 and/or system 200 has more than one projector. Similarly, when an object moves within three-dimensional environment 215, whether deliberately or accidentally, blocks 307 to 313 and blocks 321 to 325 can be repeated without having a technician return to an installation site to again manually warp the images to account for the new position of the object.

Blocks 321 to 325 are now described with reference to FIG. 17, FIG. 18, and FIG. 19, with FIGS. 17 and 19 substantially similar to FIG. 11 (and/or FIG. 2), with like elements having like numbers. Furthermore, it is assumed in the following discussion that object 216 is in the same position and orientation as in FIGS. 7 to 13.

Figure 17:
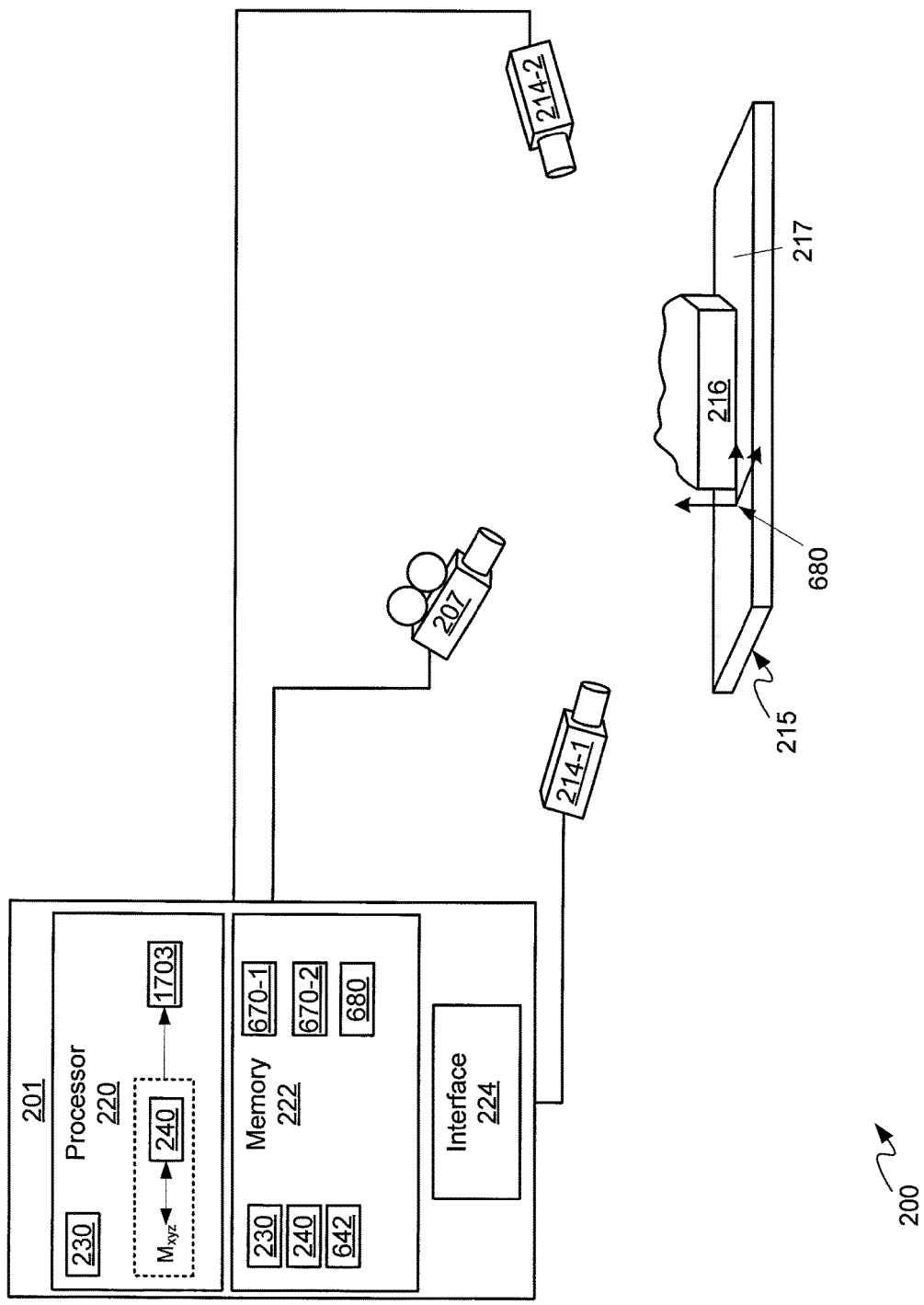
FIG. 17 depicts the system of FIG. 2 being used to determine a respective location and respective orientation of the physical object relative to a physical origin of the three-dimensional environment by comparing the virtual model to the cloud of points, according to non-limiting implementations.
Figure 18:
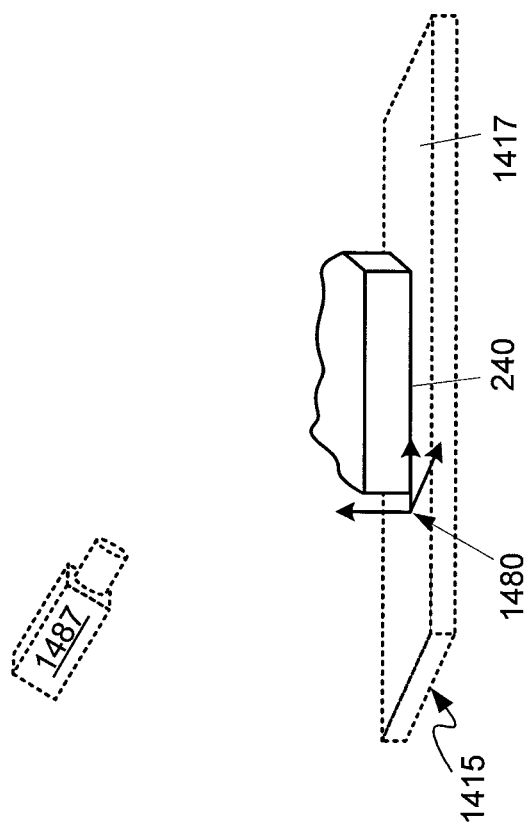
FIG. 18 depicts the virtual environment of FIG. 14 with a virtual model of the physical object of the system of FIG. 2 being placed therein, according to non-limiting implementations.

In FIG. 17, device 201 compares cloud of points $M_{xyz}$ with virtual model 240 of object 216 (e.g. at block 321), using any suitable technique including, but not limited to, an iterative closest point scheme. Such a comparison is used to determine a respective location and respective orientation of physical object relative to physical origin 680 of three-dimensional environment 215. In other words, dimensions, surfaces, shapes, and the like, of object 216 are defined within virtual model 240, and an actual location, orientation etc. of object 216 in environment 215 is generally defined by cloud of points $M_{xyz}$, however, heretofore, the location, orientation of object 216 has not been extracted from cloud of points $M_{xyz}$. A comparison cloud of points $M_{xyz}$ and virtual model 240, for example to align surfaces of virtual model 240 with cloud of points $M_{xyz}$ can be used to extract a respective location and respective orientation of object 216 relative to physical origin 680, as represented by parameters 1703.

Attention is next directed to FIG. 18, which again depicts virtual environment 1415, however in these implementations, a location of virtual camera 1487 has not necessarily been determined, nor is virtual camera 1487 necessarily set in virtual environment 1415 and as such, virtual camera 1487 is depicted in stippled lines. However, a virtual location and virtual orientation of virtual model 240 has been set in virtual three-dimensional environment 1415 with respect to virtual origin 1480 (related to physical origin 680, as described above), to match the respective location and the respective orientation of physical object 216. In particular, virtual model 240 replaces virtual object 1416 of FIG. 14 which was shown in FIG. 14 merely as a placeholder and/or for clarity.

Figure 19:
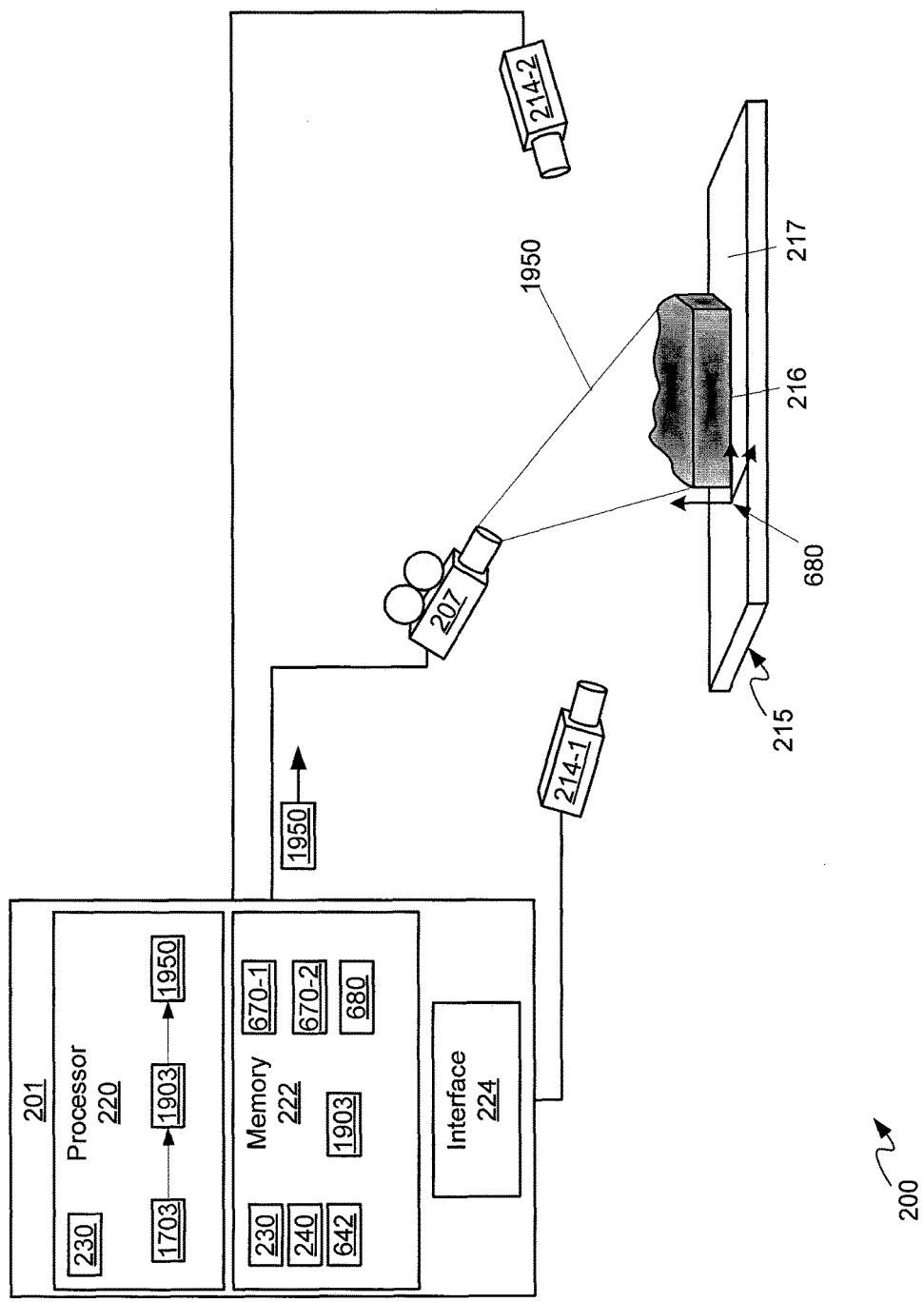
FIG. 19 depicts the projector of the system of FIG. 2 being controlled to illuminate the physical object with images adjusted for the virtual location and the virtual orientation of the virtual model

Hence, as depicted in FIG. 19, virtual location and virtual orientation of virtual model 240, represented as parameters 1903 are set to parameters 1703 (e.g. block 323). As also depicted in FIG. 19, images 1950 to be projected onto object 216 are adjusted for the virtual location and the virtual orientation of virtual model 240 (e.g. as in FIGS. 15 and 16, virtual environment 1415 is used to model environment 215). For example, with reference to FIG. 1, parameters 1703 and/or parameters 1903 can be communicated to device 101 and/or device 108, as object data 109o, to cause images received from device 101 and/or content player 103 to be rendered for projection onto object 216 without having to further warp the images using warping engine 113 (though use of warping engine 113 is not precluded from present implementations, for example to make small changes to the projected images).

It is further appreciated that blocks 307 to 313 and blocks 321 to 325 generally show a method for automatically performing alignment of an object so that automatic rendering of images projected there upon can occur. Hence, the need for using a technician to manually warp images at projector 107 and/or projector 207 has been obviated. Similarly, when an object moves within the three-dimensional environment, whether deliberately or accidentally, blocks 307 to 313 and blocks 321 to 325 can be repeated without having a technician return to an installation site to again manually warp the images to account for the new position of the object.

Furthermore, in the successful prototype, automatic alignment and projection of images onto three-dimensional objects complex geometries were achieved in less than 30 seconds, for example objects representational of animals and the like with complex non-planar surfaces and/or complex curved surfaces.

Persons skilled in the art will appreciate that there are yet more alternative implementations and modifications possible. For example, prior to block 307 being performed, device 201 can control projector 207 to project contrast calibration images, such as a sequence of chequerboard patterns, each displaced from one another, onto environment 215 to determine differences between dark areas and light areas of environment 215, for example by using cameras 214 to acquire images of environment 215 as each chequerboard pattern is projected thereupon. Such a contrast calibration assists device 201 in later determining which areas of images 751, 752 correspond to black areas (and the like) and white areas (and the like) of structured light patterns projected onto environment 215.

Furthermore, projection of structured light patterns by projector 207 and acquisition of images thereof by cameras 214 can be coordinated to minimize a time to implement method 300. In some implementations, system 200 is configured such that the time periods overlap. For example, while cameras 214 are acquiring an image of a current structured light pattern, device 201 can initiate causing projector 207 to project a next structured light pattern, assuming a delay between initiating projection of the next structured light pattern and the next structured light pattern actually being projected. The times between initiating projection of structured light patterns and acquiring images thereof can be adjusted to a minimum to reduce a time to implement method 300. In the successful prototype, such methods were used to reduce the alignment time from about 30 seconds to less than 15 seconds.

In any event, previous methods of projecting onto three-dimensional objects use two-dimensional warping as an alignment method which is generally performed manually, or determined automatically for non-complex geometry (e.g. flat rectangles, cylinders, spheres). Alternatively, projector pose can be determined by manually by dragging points manually onto an object, back calculation is used to determine where projector is located. In contrast, present implementations use an automatically determined three-dimensional projector pose as an alignment method, which is automatically applied a rendering environment. In some implementations, once pose data determined, it can automatically be applied into the rendering environment to instantly update the image data coming out of the rendering environment, for example in real-time and/or almost real-time. However, when using a rendered video pipeline, once the pose data is determined then the content is generally re-rendered; once the re-rendered image data is loaded onto a content player and played back, the same alignment results as in real-time implementations, which results in better image quality over warping solutions.

Those skilled in the art will appreciate that in some implementations, the functionality of devices 101, 108, 201, content player 103, and alignment system 105 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 108, 201, content player 103, and alignment system 105 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
   a computing device; a projector; at least two cameras, each of the projector and the at least two cameras configured for mounting relative to a three-dimensional environment with respective fields of view at least partially overlapping a projection area of the projector on the three-dimensional environment, the three-dimensional environment comprising a physical object; and a memory storing a virtual model of the physical object; the computing device configured to:
   control the projector to sequentially project one or more structured light patterns configured to uniquely illuminate different portions of the three-dimensional environment and the physical object;
   acquire one or more respective images from each of the at least two cameras while the projector is projecting the one or more structured light patterns, each of the one or more respective images correlated with a given respective structured light pattern;
   generate a two-dimensional mapping of the different portions of the three-dimensional environment between a projector space and a camera space by processing the respective images and correlated given respective structured light patterns;
   generate a cloud of points representing the three-dimensional environment using the two-dimensional mapping and given positions of the at least two cameras relative to the three-dimensional environment;
   determine a location, an orientation and lens characteristics of the projector relative to the three-dimensional environment, from the cloud of points;
   position a virtual camera relative to a virtual three-dimensional environment, corresponding to the three-dimensional environment, a virtual location, a virtual orientation and virtual lens characteristics of the virtual camera respectively matching the location, the orientation and the lens characteristics of the projector;
   align surfaces of the virtual model with the cloud of points to extract a respective location and respective orientation of the physical object relative to a physical origin of the three-dimensional environment, wherein the surfaces of the physical object are defined within the virtual model, and an actual location and orientation of the physical object in the three-dimensional environment is defined by the cloud of points, wherein aligning the surfaces of the virtual model with the cloud of points comprises comparing the surfaces of the virtual model with the cloud of points using an iterative closest point scheme;
   set a virtual location and virtual orientation of the virtual model in the virtual three-dimensional environment with respect to a virtual origin, related to the physical origin, to match the respective location and the respective orientation of the physical object;
   render images for projection onto the physical object based on the virtual location, the virtual orientation and the virtual lens characteristics of the virtual camera, and the respective location, the images adjusted for the virtual location and the virtual orientation of virtual model; and,
   control the projector to project based on the virtual location, the virtual orientation and the virtual lens characteristics of the virtual camera and, control the projector to illuminate the physical object with the images adjusted for the virtual location and the virtual orientation of the virtual model.

2. The system of claim 1, wherein the physical object of the three-dimensional environment comprises one or more of: a surface; a curved surface; and an irregular surface.

3. The system of claim 1, wherein the one or more structured light patterns comprises a sequence of structured light patterns configured to uniquely sequentially illuminate different portions of the three-dimensional environment and the physical object.

4. The system of claim 1, wherein the one or more structured light patterns comprise a sequence of images of horizontal bars and vertical bars, the bars either halving or doubling in width within the sequence and in each direction.

5. The system of claim 1, wherein the one or more structured light patterns comprises one or more of: a sequence of images of bars; black and white images; colored images; and images of sinusoids.

6. The system of claim 1, wherein the computing device is further configured to determine the given positions of the at least two cameras relative to the three-dimensional environment, and set a physical origin of the three-dimensional environment by:
   acquiring at least one image of a known target pattern positioned in the three-dimensional environment from each of the at least two cameras; and, comparing the at least one image of the known target pattern with a representation of the known target pattern.

7. The system of claim 1, wherein the computing device is further configured to generate the cloud of points representing the three-dimensional environment using the two-dimensional mapping and the given positions of the at least two cameras relative to the three-dimensional environment using triangulation.

8. The system of claim 1, wherein the computing device is further configured to determine the location, the orientation and the lens characteristics of the projector relative to the three-dimensional environment, from the cloud of points by matching a plurality of points from the cloud of points to respective areas of one or more of the structured light patterns.

9. The system of claim 1, wherein the virtual location, the virtual orientation and the virtual lens characteristics comprises pose data comprising: a three-dimensional position of the virtual camera in the virtual three-dimensional environment with respect to a virtual origin, related to the physical origin; a pitch value; a yaw value; a roll value; and an offset value.

10. A method comprising:
controlling a projector, using a computing device, to sequentially project one or more structured light patterns configured to uniquely illuminate different portions of a three-dimensional environment and a physical object, the three-dimensional environment comprising the physical object;
acquiring one or more respective images from each of at least two cameras, using the computing device, while the projector is projecting the one or more structured light patterns, each of the one or more respective images correlated with a given respective structured light pattern, each of the projector and the at least two cameras mounted relative to the three-dimensional environment with respective fields of view at least partially overlapping a projection area of the projector on the three-dimensional environment;
generating, using the computing device, a two-dimensional mapping of the different portions of the three-dimensional environment between a projector space and a camera space by processing the respective images and correlated given respective structured light patterns;
generating, using the computing device, a cloud of points representing the three-dimensional environment using the two-dimensional mapping and given positions of the at least two cameras relative to the three-dimensional environment;
determining, using the computing device, a location, an orientation and lens characteristics of the projector relative to the three-dimensional environment, from the cloud of points;
positioning, using the computing device, a virtual camera relative to a virtual three-dimensional environment, corresponding to the three-dimensional environment, a virtual location, a virtual orientation and virtual lens characteristics of the virtual camera respectively matching the location, the orientation and the lens characteristics of the projector;
aligning surfaces of a virtual model, stored in a memory, with the cloud of points to extract a respective location and respective orientation of the physical object relative to a physical origin of the three-dimensional environment, wherein the surfaces of the physical object are defined within the virtual model, and an actual location and orientation of the physical object in the three-dimensional environment is defined by the cloud of points, wherein the aligning the surfaces of the virtual model with the cloud of points comprises comparing the surfaces of the virtual model with the cloud of points using an iterative closest point scheme;
setting a virtual location and virtual orientation of the virtual model in the virtual three-dimensional environment with respect to a virtual origin, related to the physical origin, to match the respective location and the respective orientation of the physical object;
rendering images for projection onto the physical object based on the virtual location, the virtual orientation and the virtual lens characteristics of the virtual camera, and the respective location, the images adjusted for the virtual location and the virtual orientation of virtual model; and,
controlling the projector, using the computing device, to project based on the virtual location, the virtual orientation and the virtual lens characteristics of the virtual camera, and controlling the projector to illuminate the physical object with the images adjusted for the virtual location and the virtual orientation of the virtual model.

11. The method of claim 10, wherein the one or more structured light patterns comprises one or more of: a sequence of structured light patterns configured to uniquely sequentially illuminate different portions of the three-dimensional environment and the physical object; a sequence of images of horizontal bars and vertical bars, the bars either halving or doubling in width within the sequence and in each direction; a sequence of images of bars; black and white images; colored images; and images of sinusoids.

12. The method of claim 10, further comprising determining the given positions of the at least two cameras relative to the three-dimensional environment, and set a physical origin of the three-dimensional environment by:
acquiring at least one image of a known target pattern positioned in the three-dimensional environment from each of the at least two cameras; and, comparing the at least one image of the known target pattern with a representation of the known target pattern.

13. The method of claim 10, further comprising generating the cloud of points representing the three-dimensional environment using the two-dimensional mapping and the given positions of the at least two cameras relative to the three-dimensional environment using triangulation.

14. The method of claim 10, further comprising determining the location, the orientation and the lens characteristics of the projector relative to the three-dimensional environment, from the cloud of points by matching a plurality of points from the cloud of points to respective areas of one or more of the structured light patterns.

15. The method of claim 10, wherein the virtual location, the virtual orientation and the virtual lens characteristics comprises pose data comprising: a three-dimensional position of the virtual camera in the virtual three-dimensional environment with respect to a virtual origin, related to the physical origin; a pitch value; a yaw value; a roll value; and an offset value.

16. A non-transitory computer-readable medium storing a computer program, wherein execution of the computer program is for:
controlling a projector, using a computing device, to sequentially project one or more structured light patterns configured to uniquely illuminate different portions of a three-dimensional environment and a physical object, the three-dimensional environment comprising the physical object;
acquiring one or more respective images from each of at least two cameras, using the computing device, while the projector is projecting the one or more structured light patterns, each of the one or more respective images correlated with a given respective structured light pattern, each of the projector and the at least two cameras mounted relative to the three-dimensional environment with respective fields of view at least partially overlapping a projection area of the projector on the three-dimensional environment;
generating, using the computing device, a two-dimensional mapping of the different portions of the three-dimensional environment between a projector space and a camera space by processing the respective images and correlated given respective structured light patterns;
generating, using the computing device, a cloud of points representing the three-dimensional environment using the two-dimensional mapping and given positions of the at least two cameras relative to the three-dimensional environment;

determining, using the computing device, a location, an orientation and lens characteristics of the projector relative to the three-dimensional environment, from the cloud of points;

positioning, using the computing device, a virtual camera relative to a virtual three-dimensional environment, corresponding to the three-dimensional environment, a virtual location, a virtual orientation and virtual lens characteristics of the virtual camera respectively matching the location, the orientation and the lens characteristics of the projector;

aligning surfaces of a virtual model, stored in a memory, with the cloud of points to extract a respective location and respective orientation of the physical object relative to a physical origin of the three-dimensional environment, wherein the surfaces of the physical object are defined within the virtual model, and an actual location and orientation of the physical object in the three-dimensional environment is defined by the cloud of points, wherein the aligning the surfaces of the virtual model with the cloud of points comprises comparing the surfaces of the virtual model with the cloud of points using an iterative closest point scheme;

setting a virtual location and virtual orientation of the virtual model in the virtual three-dimensional environment with respect to a virtual origin, related to the physical origin, to match the respective location and the respective orientation of the physical object;

rendering images for projection onto the physical object based on the virtual location, the virtual orientation and the virtual lens characteristics of the virtual camera, and the respective location, the images adjusted for the virtual location and the virtual orientation of virtual model; and, controlling the projector, using the computing device, to project based on the virtual location, the virtual orientation and the virtual lens characteristics of the virtual camera, and controlling the projector to illuminate the physical object with the images adjusted for the virtual location and the virtual orientation of the virtual model.

* * * * *